(12) United States Patent
Shibuya

(10) Patent No.: US 8,750,182 B2
(45) Date of Patent: Jun. 10, 2014

(54) WIRELESS COMMUNICATION TERMINAL

(75) Inventor: Kazuyuki Shibuya, Sagamihara (JP)

(73) Assignee: Olympus Corporation, Tokyo (JP)

( * ) Notice: Subject to any disclaimer, the term of this patent is extended or adjusted under 35 U.S.C. 154(b) by 33 days.

(21) Appl. No.: 13/567,200

(22) Filed: Aug. 6, 2012

(65) Prior Publication Data

US 2013/0039356 A1 Feb. 14, 2013

(30) Foreign Application Priority Data

Aug. 10, 2011 (JP) ................................ 2011-174896

(51) Int. Cl.
*H04B 7/00* (2006.01)

(52) U.S. Cl.
USPC ........................................................ 370/310

(58) Field of Classification Search
None
See application file for complete search history.

(56) References Cited

U.S. PATENT DOCUMENTS

| | | | | |
|---|---|---|---|---|
| 2010/0189012 A1* | 7/2010 | Shibuya et al. | | 370/254 |
| 2010/0260069 A1* | 10/2010 | Sakamoto et al. | | 370/254 |
| 2010/0291954 A1* | 11/2010 | Nakajima | | 455/507 |
| 2011/0058536 A1* | 3/2011 | Tsuchiya et al. | | 370/338 |
| 2011/0161480 A1* | 6/2011 | Kim et al. | | 709/223 |
| 2011/0194489 A1* | 8/2011 | Itaya et al. | | 370/328 |
| 2011/0205971 A1* | 8/2011 | Ito et al. | | 370/328 |
| 2011/0230139 A1* | 9/2011 | Nakahara | | 455/41.2 |
| 2012/0033568 A1* | 2/2012 | Park et al. | | 370/252 |
| 2012/0230221 A1* | 9/2012 | Radhakrishnan et al. | | 370/254 |
| 2013/0148643 A1* | 6/2013 | Abraham et al. | | 370/338 |
| 2013/0150016 A1* | 6/2013 | Nakajima | | 455/418 |
| 2013/0195271 A1* | 8/2013 | Miyabayashi et al. | | 380/255 |

OTHER PUBLICATIONS

Wi-Fi Simple Configuration Technical Specification v2.0.0,2010 (https://www.wi-fi.org/knowledge_center_overview.php?type=4.) pp. 34 of 154-35 of 154 and pp. 69 of 154-70 of 154 cited in specification.

* cited by examiner

*Primary Examiner* — Clemence Han
(74) *Attorney, Agent, or Firm* — Westerman, Hattori, Daniels & Adrian, LLP

(57) ABSTRACT

A wireless communication terminal may include a storage unit that stores an identifier of the proxy terminal in the wireless network, a wireless communication unit that performs wireless communication with another wireless communication terminal, an event receiving unit that receives a predetermined event, a processing unit that starts a participation setup process of causing the non-participating terminal that has wirelessly transmitted a participation setup process request for the wireless network to participate in the wireless network when a participation request for the wireless network and the participation setup process request for the wireless network are received after the event is received by the event receiving unit, and a control unit that causes the wireless communication unit to wirelessly transmit the event request of requesting the proxy terminal corresponding to the identifier stored in the storage unit to receive the event when a new participation request is received during a time.

10 Claims, 22 Drawing Sheets

WIRELESS COMMUNICATION TERMINAL

BACKGROUND OF THE INVENTION

1. Field of the Invention

The present invention relates to a wireless communication terminal that performs a participation setup process of causing a wireless communication terminal that is not participating in a wireless network to participate in the wireless network.

Priority is claimed on Japanese Patent Application No. 2011-174896, filed Aug. 10, 2011, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In the past, in wireless communication terminals with a wireless local area network (LAN) function, it was necessary to set various information (network setting information) such as a network ID (SSID), an authentication scheme, an encryption scheme, and an encryption key in order to participate in a network (an infrastructure network) provided by an access point (hereinafter referred to as "AP"). Further, it was necessary to input various settings on the wireless communication terminal in order to perform the setting. Since inputting the setting was complicated, it was not easy, in particular, for a user who was less attuned to a wireless LAN technique to perform the setting.

In order to solve the above-mentioned problem, as an industry standard technique of a wireless LAN for causing a wireless communication terminal to participate in an infrastructure network through a simple setting process of network setting information ("participation setup process"), Wi-Fi Protected Setup (TM) (hereinafter referred to as "WPS") is performed, and Wi-Fi Simple Configuration Specification v2.0.0 has been disclosed as the technical specification.

Several setup methods are specified in WPS. For example, in a first setup method (hereinafter referred to as a "push button configuration (PBC) method"), a participation setup process is performed such that a user pushes an actual button, or a button on a screen using a GUI function (a graphical user interface function) in each of a non-participating wireless communication terminal that has a wireless LAN function and tries to participate in a network and a wireless communication terminal (mostly AP) that is already participating in the network, and a fixed value defined in WPS is used in both wireless communication terminals as identification information for the participation setup process. Further, in a second setup method (hereinafter referred to as a "personal identification number (PIN) method"), the participation setup process is performed such that a non-participating wireless communication terminal inputs a PIN code generated as an arbitrary value and displayed on a screen to a participating wireless communication terminal (mostly AP) as identification information for the participation setup process.

By performing the participation setup process through these setup methods, the network setting information held in the AP can be safely transferred to the wireless communication terminal. After the transfer of the network setting information by WPS is completed, the user need not perform a burdensome task such as an input of the encryption key or the like. The wireless communication terminal can set the transferred network setting information, execute an authentication process with the AP as necessary, and perform data communication with the AP. Further, the PIN code may be input to the AP using a browser from another terminal in a network to which the AP belongs.

In recent years, an ad-hoc mode that allows the wireless communication terminals to directly perform wireless LAN communication, unlike an infrastructure mode needing an AP, has started to be widely used in portable terminals such as game machines and cameras. In the ad-hoc mode, there is no terminal that becomes central in a network like an AP in the infrastructure mode, and each terminal performs communication on an equal level.

Even in the ad-hoc mode, it is complicated to set the network setting information like the infrastructure mode. However, it is desirable to allow a conventional WPS to be performed in an ad-hoc network. At this time, since there is no terminal that functions to manage a network like the AP in the infrastructure mode in the ad-hoc mode, for example, in the PBC method, when a button is pushed on any one of participating wireless communication terminals, the participation setup process with a non-participating wireless communication terminal can be performed.

FIGS. 20A to 20C and FIGS. 21A to 21C illustrate an example of causing a plurality of non-participating terminals to participate in the ad-hoc network by the PBC method of WPS in a state in which there are a plurality of wireless communication terminals which are participating in the existing ad-hoc network. As illustrated in FIG. 20A, wireless communication terminals 130 and 131 are already participating in an ad-hoc network 180, and wireless communication terminals 132 and 133 are not yet participating in the ad-hoc network 180.

In order to cause the plurality of non-participating wireless communication terminals to participate in the ad-hoc network by the PBC method, a user pushes buttons on any one participating wireless communication terminal 130 and one non-participating wireless communication terminal 132 desired to firstly participate (FIG. 20A), so that the participation setup process is executed between the wireless communication terminals (FIG. 20B). When the participation setup process is completed, the non-participating wireless communication terminal 132 becomes a wireless communication terminal that is participating in the ad-hoc network 180 because the participation setup process has been performed (FIG. 20C).

After visually confirming completion of the participation setup process, the user subsequently pushes buttons on any one participating wireless communication terminal 130 and one wireless communication terminal 133 desired to participate next (FIG. 21A). In FIG. 21A, although the button is pushed down on the participating wireless communication terminal 130, which is the participating wireless communication terminal whose button was pushed down in the previous participation setup process, the button may be pushed down in any other wireless communication terminal that is participating. The participation setup process is executed between the wireless communication terminals whose buttons are pushed down (FIG. 21B). When the participation setup process is completed, the wireless communication terminal 133 that was not participating becomes a wireless communication terminal that is participating in the ad-hoc network 180 because the participation setup process has been performed (FIG. 21C). In this way, a plurality of non-participating wireless communication terminals can participate in the existing ad-hoc network.

The participation setup process of WPS requires an exchange of various messages and a complicated calculation during processing. Thus, it may take tens of seconds to complete the participation setup process if it is long. In the above described procedure, the user visually confirms completion of the participation setup process and then pushes the button down again, and thus the time the user is constrained to push the button down is long. In addition, time is taken until participation of all the non-participating wireless communication terminals is completed.

In addition, as illustrated in FIGS. 22A to 22D, when buttons are pushed down in both wireless communication terminals (FIG. 22A), buttons may be pushed down in the participating wireless communication terminal 131 and the non-participating wireless communication terminal 133 (FIG. 22B), which are different from the participating wireless communication terminal 130 and the non-participating wireless communication terminal 132 whose buttons are first pushed down, without waiting for completion of the participation setup process. In this case, the non-participating wireless communication terminal 133 detects a plurality of participating wireless communication terminals whose buttons have been pushed down (FIG. 22C). However, it is difficult for the non-participating wireless communication terminal 133 to determine which participating wireless communication terminal will perform the participation setup process together with itself from among the participating wireless communication terminals whose buttons have been pushed down. Thus, an error representing that a plurality of wireless communication terminals have been detected in WPS occurs (FIG. 22D).

SUMMARY

The present invention provides a wireless communication terminal which is capable of reducing a standby time of a participation setup process and reducing a time taken until participation of all non-participating wireless communication terminals is completed when a plurality of non-participating wireless communication terminals join an existing wireless network.

A wireless communication terminal that is participating in a predetermined wireless network, wherein a wireless communication terminal that is not participating in the wireless network is defined as a non-participating terminal, and a wireless communication terminal participating in the wireless network that receives a predetermined event by receiving an event request wirelessly transmitted from a participating terminal which is a wireless communication terminal participating in the wireless network, and then starts a participation setup process of causing the non-participating terminal that has wirelessly transmitted a participation setup process request for the wireless network to participate in the wireless network when the participation setup process request for the wireless network wirelessly transmitted from the non-participating terminal is received is defined as a proxy terminal, may include: a storage unit that stores an identifier of the proxy terminal in the wireless network; a wireless communication unit that performs wireless communication with another wireless communication terminal; an event receiving unit that receives a predetermined event; a processing unit that starts a participation setup process of causing the non-participating terminal that has wirelessly transmitted a participation setup process request for the wireless network to participate in the wireless network when a participation request for the wireless network and the participation setup process request for the wireless network are received after the event is received by the event receiving unit; and a control unit that causes the wireless communication unit to wirelessly transmit the event request of requesting the proxy terminal corresponding to the identifier stored in the storage unit to receive the event when a new participation request is received during a time from the beginning of the participation setup process by the processing unit until the participation setup process is completed.

When the new participation request is received during the time from the beginning of the participation setup process by the processing unit until the participation setup process is completed, the control unit may cause the wireless communication unit to wirelessly transmit information to notify of the proxy terminal corresponding to the identifier stored in the storage unit to the non-participating terminal that has wirelessly transmitted the new participation request.

When the new participation request is received during the time from the beginning of the participation setup process by the processing unit until the participation setup process is completed, the control unit may cause the wireless communication unit to wirelessly transmit information related to the non-participating terminal that has wirelessly transmitted the new participation request to the proxy terminal corresponding to the identifier stored in the storage unit.

When the new participation request is received and the new event is received by the event receiving unit during the time from the beginning of the participation setup process by the processing unit until the participation setup process is completed, the control unit may cause the wireless communication unit to wirelessly transmit the event request of requesting the proxy terminal corresponding to the identifier stored in the storage unit to receive the event.

The control unit may determine a method of the participation setup process based on the event received by the event receiving unit.

The method of the participation setup process may be either a push button configuration (PBC) method or a personal identification number (PIN) method, which are specified in a Wi-Fi Protected Setup (WPS) connection initiation protocol.

The wireless communication terminal may further include an operating unit. The event receiving unit may receive the event by a predetermined operation of the operating unit or a predetermined operation of an application.

A wireless communication terminal that is participating in a predetermined wireless network, wherein a wireless communication terminal that is not participating in the wireless network is defined as a non-participating terminal, and a wireless communication terminal participating in the wireless network that receives a predetermined event, then starts a participation setup process of causing the non-participating terminal that has wirelessly transmitted a participation setup process request to participate in the wireless network when a participation request for the wireless network and the participation setup process request for the wireless network are received from the non-participating terminal, and wirelessly transmits an event request of requesting reception of the event when a new participation request is received during a time from the beginning of the participation setup process until the participation setup process is completed is defined as a participating terminal, may include: a wireless communication unit that performs wireless communication with another wireless communication terminal; an event receiving unit that receives the event when the event request is received from the participating terminal; and a processing unit that starts a participation setup process of causing the non-participating terminal that has wirelessly transmitted a participation setup process request to participate in the wireless network when the participation setup process request is received from the non-participating terminal after the event is received by the event receiving unit.

When information related to the non-participating terminal that has wirelessly transmitted the participation request received by the participating terminal is received from the participating terminal during the time from the beginning of the participation setup process by the participating terminal until the participation setup process is completed, the processing unit may start the participation setup process of causing the non-participating terminal that has wirelessly transmitted the participation setup process request to participate in the wireless network when the participation setup process request is received from the non-participating terminal represented by the information after the event is received by event receiving unit.

The processing unit may start the participation setup process of causing the non-participating terminal that has wirelessly transmitted the participation setup process request to participate in the wireless network when the participation request and the participation setup process request are received from the non-participating terminal after the event is received by event receiving unit.

According to the present invention, when a wireless communication terminal that is participating in a wireless network receives a new participation request from a wireless communication terminal that is not participating in the wireless network during a time from the beginning of a participation setup process until the participation setup process is completed, a proxy terminal executes the participation setup process. Thus, a situation in which the wireless communication terminal that is not participating in the wireless network is on standby for completion of the participation setup process which is being executed between itself and another wireless communication terminal does not occur. Thus, when a plurality of non-participating wireless communication terminals join an existing wireless network, the standby time of the participation setup process can be reduced, and a time taken until participation of all of the non-participating wireless communication terminals is completed can be reduced.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
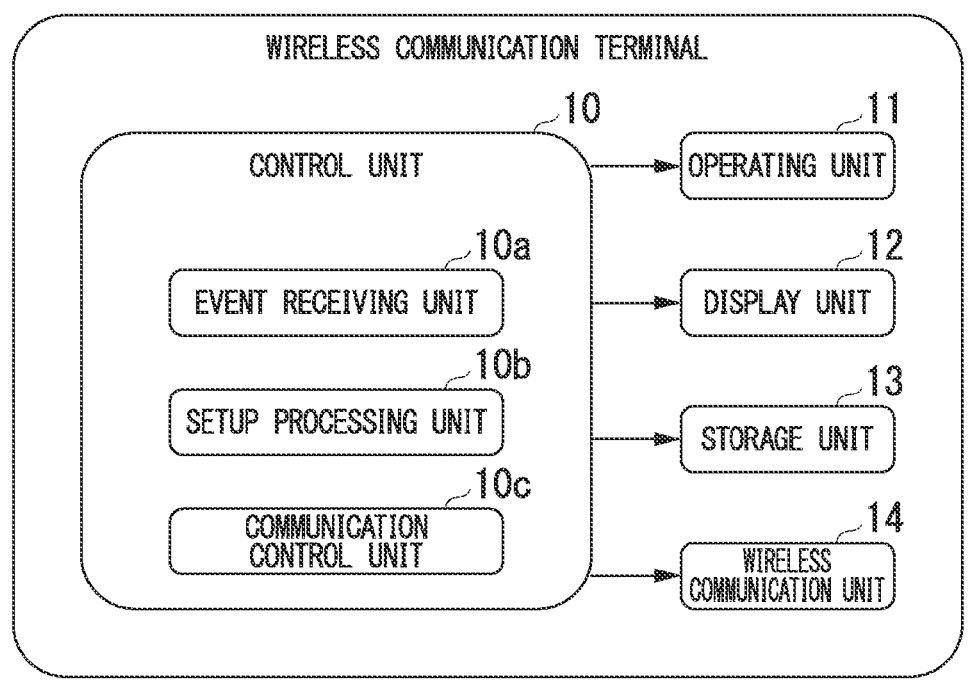
FIG. 1 is a block diagram illustrating a configuration of a wireless communication terminal in accordance with a preferred embodiment of the present invention.

FIG. 1 illustrates a configuration of a wireless communication terminal (wireless communication terminals 1 to 4 which will be described later) in accordance with a preferred embodiment of the present invention. The wireless communication terminal illustrated in FIG. 1 includes a control unit 10, an operating unit 11, a display unit 12, a storage unit 13, and a wireless communication unit 14.

The control unit 10 controls the components of the wireless communication terminal. The operating unit 11 includes an operation member such as a button operated by the user. The display unit 12 displays various pieces of information to be provided to the user. The storage unit 13 stores various pieces of information used for processing in the wireless communication terminal. The wireless communication unit 14 transmits information or data to another wireless communication terminal or receives information or data from another wireless communication terminal under control of the control unit 10. Upon receiving information or data from another wireless communication terminal, the wireless communication unit 14 outputs the received information or data to the control unit 10. The information or data output to the control unit 10 is appropriately stored in the storage unit 13.

The control unit 10 has functions of an event receiving unit 10a, a setup processing unit 10b, and a communication control unit 10c. The event receiving unit 10a detects generation of an event for starting a participation setup process of setting network setting information and receives the event in order to cause a wireless communication terminal that is not participating in an ad-hoc network (wireless network) to participate in the ad-hoc network. The event receiving unit 10a can receive the event by any processing method of the PBC method and the PIN method.

In the PBC method, the event receiving unit 10a receives the event for starting the participation setup process by detecting that the user has pushed the button functioning as the operation member, that the user has pushed the button on the screen of the display unit 12 using the GUI function, or that selection of a menu corresponding to pushing-down of the button has been made. Further, in the PIN method, the event receiving unit 10a receives the event for starting the participation setup process by detecting that an application for the participation setup process has been activated (that an application has been activated by the user's operation or an application has been automatically activated after the wireless communication terminal is powered on).

The setup processing unit 10b performs the participation setup process with another wireless communication terminal. The setup processing unit 10b can perform the participation setup process by either or both of the PBC method and the PIN method. The communication control unit 10c performs control related to a probe request, a probe response, a participation setup process request, and transmission and reception of a trigger signal, which will be described later.

In the present preferred embodiment, when the event for starting the participation setup process is received, a wireless communication terminal (a non-participating terminal) that is not participating in an ad-hoc network transmits a probe request corresponding to a participation request for participating in the ad-hoc network. Further, when a probe response which is a response to the probe request is received, the wireless communication terminal that is not participating in the ad-hoc network transmits a participation setup process request for participating in the ad-hoc network to a wireless communication terminal which is a transmission source of the probe response.

In addition, when the event for starting the participation setup process is received and then the probe request is received, a wireless communication terminal (a participating terminal) that is participating in the ad-hoc network transmits the probe response to the wireless communication terminal which is a transmission source of the probe request. Further, when the participation setup process request is received, the wireless communication terminal that is participating in the ad-hoc network starts the participation setup process of causing the wireless communication terminal that is the transmission source of the participation setup process request to participate in the ad-hoc network.

However, it is difficult for a wireless communication terminal which is in the process of executing the participation setup process to execute another participation setup process in parallel with the participation setup process which is being executed. For this reason, in the present preferred embodiment, when a new probe request is received in the process of executing the participation setup process, in order to cause another wireless communication terminal to perform the participation setup process by proxy, the wireless communication terminal that is participating in the ad-hoc network transmits a trigger signal which is an event request for requesting reception of the event to another wireless communication terminal (proxy terminal) which is participating in the ad-hoc network. When the event through the trigger signal is received and thereafter the participation setup process request is received, the wireless communication terminal that has received the trigger signal starts the participation setup process of causing the wireless communication terminal that is the transmission source of the participation setup process request to participate in the ad-hoc network.

As described above, even when the wireless communication terminal that is participating in the ad-hoc network receives a new probe request in the process of executing the participation setup process, the wireless communication terminal that has received the trigger signal can execute the participation setup process by proxy. As a result, the wireless communication terminal that transmitted the probe request need not be on standby for completion of the participation setup process which is being performed between itself and another wireless communication terminal, and thus the standby time for the participation setup process can be reduced.

First Operation Example

Figure 2:
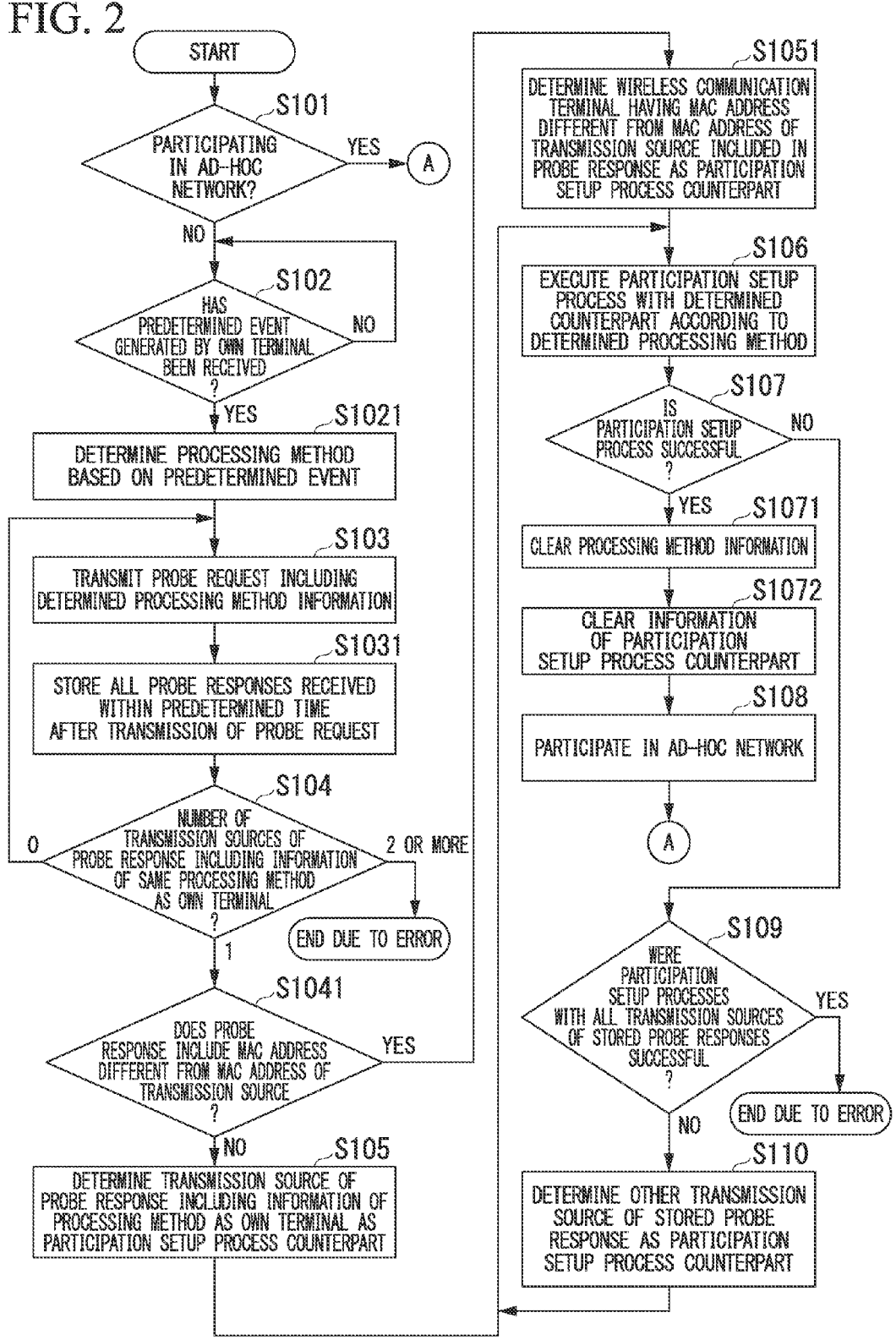
FIG. 2 is a flowchart illustrating an operation process of a wireless communication terminal in accordance with a preferred embodiment of the present invention.
Figure 3:
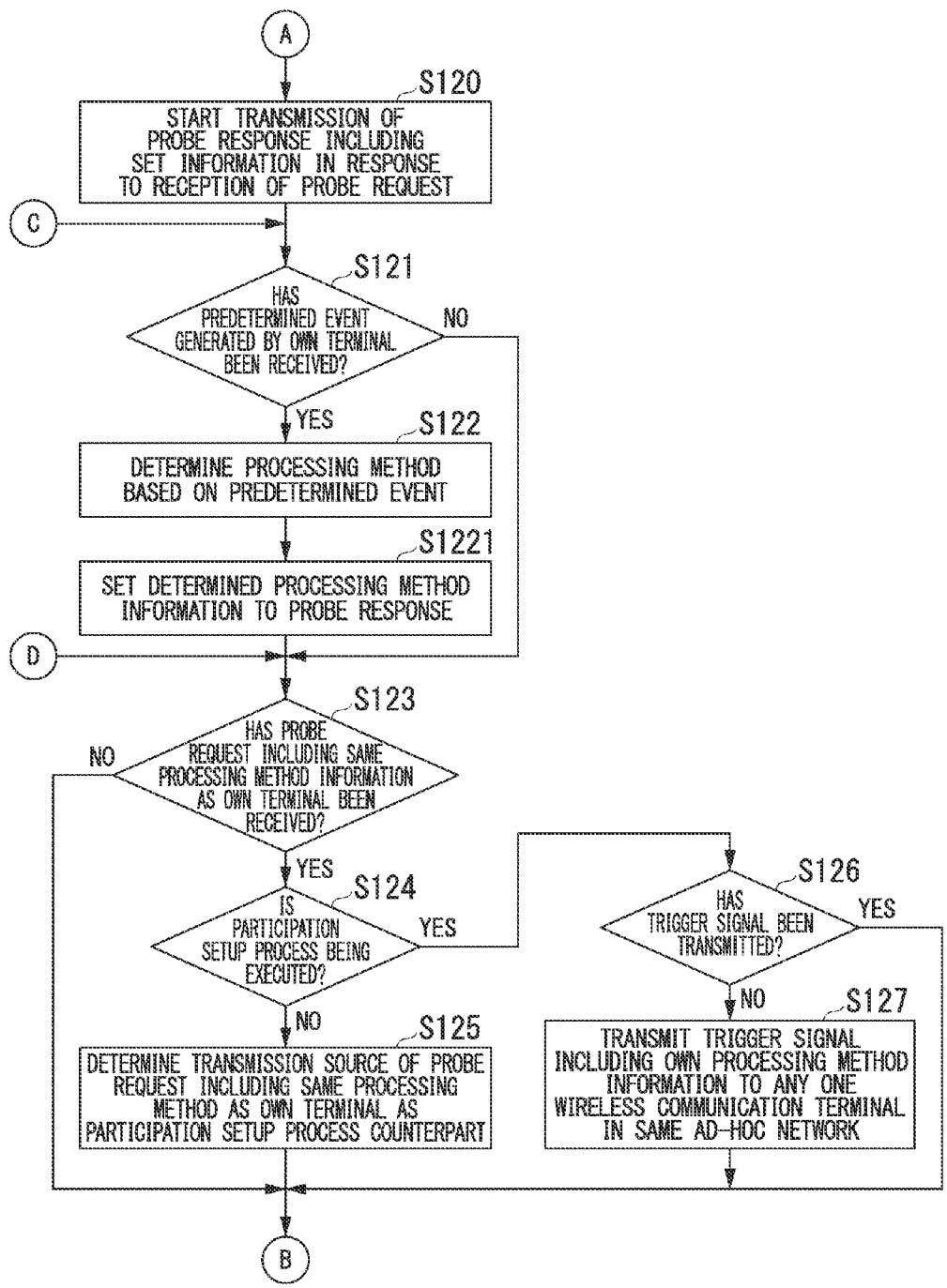
FIG. 3 is a flowchart illustrating an operation process of a wireless communication terminal in accordance with a preferred embodiment of the present invention.
Figure 4:
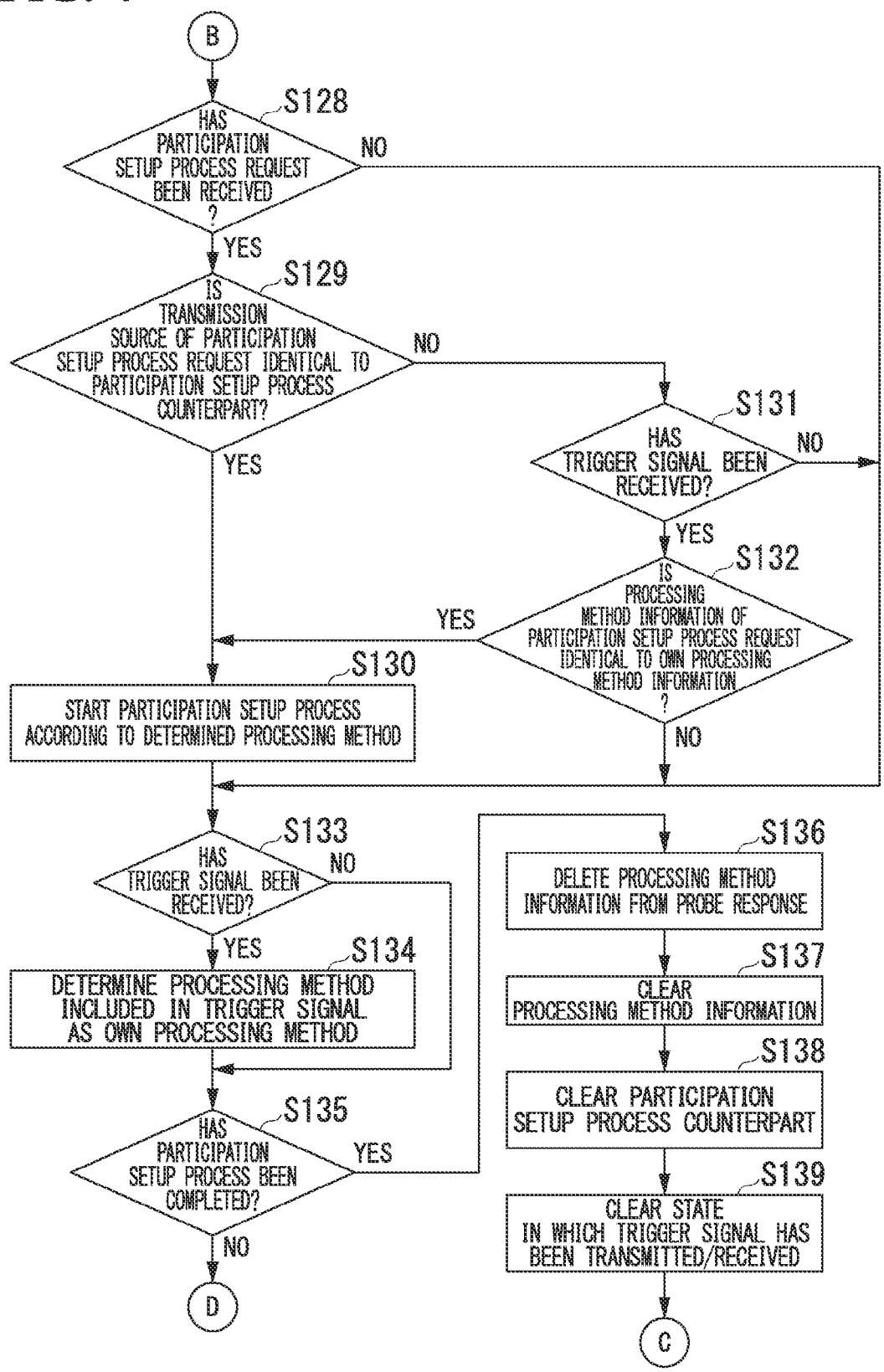
FIG. 4 is a flowchart illustrating an operation process of a wireless communication terminal in accordance with a preferred embodiment of the present invention.
Figure 5:
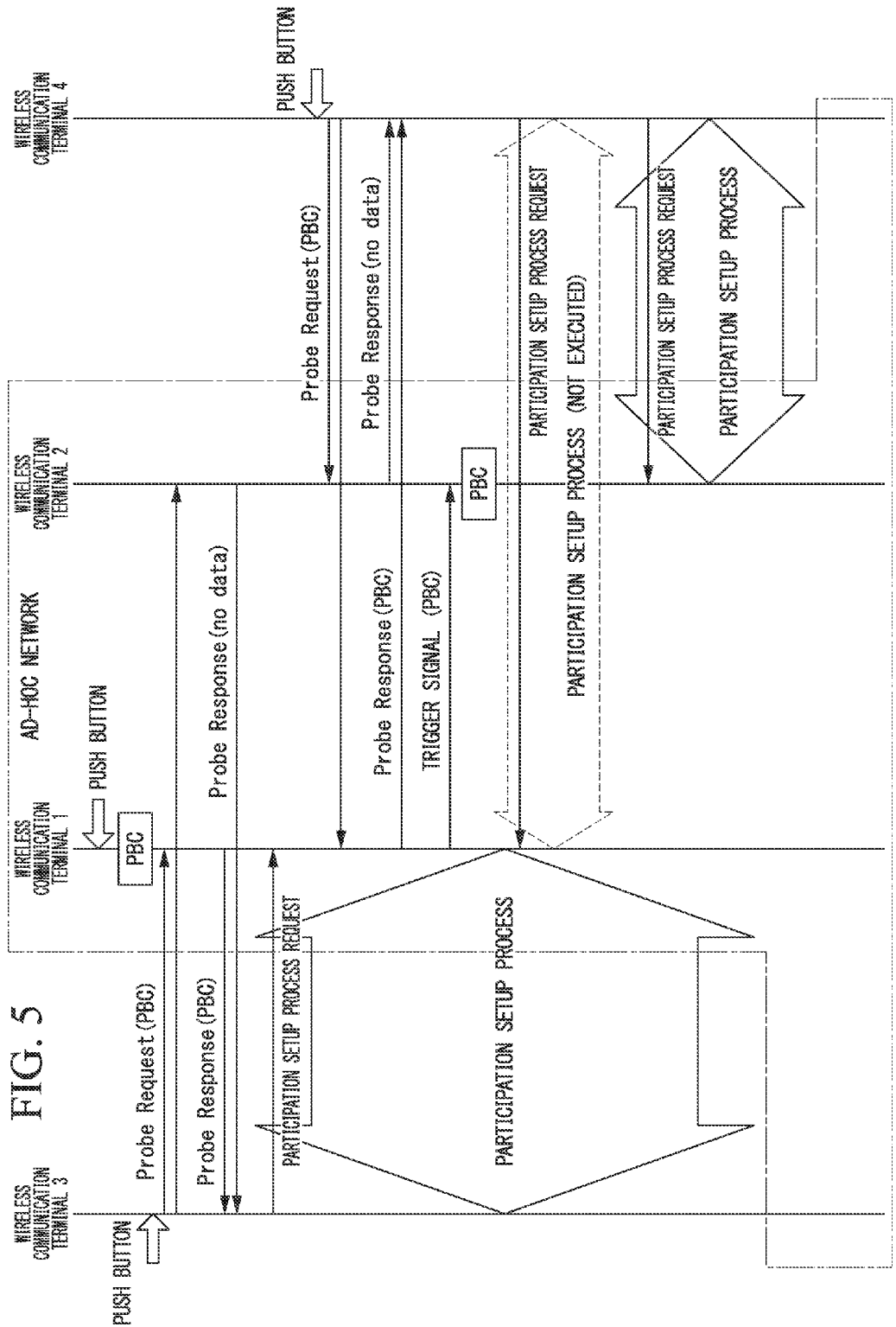
FIG. 5 is a sequence diagram illustrating a communication process between wireless communication terminals in accordance with a preferred embodiment of the present invention.

Next, a detailed operation of a wireless communication terminal will be described. First, a first operation example will be described with reference to FIGS. 2 to 5. FIGS. 2 to 4 illustrate a detailed processing procedure of a wireless communication terminal. FIG. 5 illustrates a concrete example of an operation according to FIGS. 2 to 4. An operation of FIGS. 2 to 4 will be more easily understood by referring to FIGS. 2 to 4 after referring to FIG. 5.

FIG. 2 mainly illustrates an operation of a non-participating wireless communication terminal that is not participating in the ad-hoc network. First, the control unit 10 determines whether or not its own wireless communication terminal is participating in the ad-hoc network (step S101). The determination of step S101 is made based on an internal state of its own wireless communication terminal. The storage unit 13 stores the network setting information. When a TSF timer of the ad-hoc network corresponding to the network setting information remains synchronized with its own TSF timer, it is determined that its own wireless communication terminal is participating in the ad-hoc network. However, when the TSF timer of the ad-hoc network corresponding to the network setting information does not remain synchronized with its own TSF timer, it is determined that its own wireless communication terminal is not yet participating in the ad-hoc network.

Here, when it is determined that its own wireless communication terminal is participating in the ad-hoc network, the process proceeds to step S120 of FIG. 3. However, when it is determined that its own wireless communication terminal is not yet participating in the ad-hoc network, the control unit 10 determines whether or not a predetermined event for starting the participation setup process has been received (step S102). The predetermined event determined in step S102 refers to an event for starting the participation setup process, which is generated by its own wireless communication terminal according to the PBC method or the PIN method.

Here, when it is determined that the predetermined event has not been received, the determination of step S102 is made again. However, when it is determined that the predetermined event has been received, the control unit 10 determines a processing method of the participation setup process according to the type of the received event (step S1021). Specifically, when the event received in step S102 is the event for starting the participation setup process that is generated by the PBC method, the control unit 10 determines the PBC method as the processing method. However, when the event received in step S102 is the event for starting the participation setup process that is generated by the PIN method, the control unit 10 determines the PIN method as the processing method. Here, information of the determined processing method is stored in the storage unit 13.

Subsequently, the control unit 10 controls the wireless communication unit 14 such that a probe request (participation request) including processing method information representing the processing method determined in step S1021 is transmitted. Through this control of the control unit 10, the wireless communication unit 14 transmits the probe request (step S103). At this time, the probe request is transmitted in a broadcast manner.

The control unit 10 stores all probe responses received within a predetermined time after transmission of the probe request in the storage unit 13 (step S1031). Then, the control unit 10 determines the number of wireless communication terminals which are transmission sources of the probe response including the processing method information representing the same processing method as the processing method determined in step S1021 (step S104).

Here, when the number of wireless communication terminals is zero (0), the process returns to step S103. However, when the number of wireless communication terminals is two (2) or more, the control unit 10 determines it as an error and ends the process. Further, when the number of wireless communication terminals is one (1), the control unit 10 determines whether or not the probe response including the processing method information representing the same processing method as the processing method determined in step S1021 includes a MAC address which is different from a MAC address of the wireless communication terminal which is the transmission source of the probe response in addition to the MAC address of the wireless communication terminal of the transmission source (step S1041).

Here, when the MAC address that is different from the MAC address of the transmission source is included in the probe response, the control unit 10 determines the wireless communication terminal having the corresponding different MAC address as a counterpart with which to perform the participation setup process (step S1051). However, when the MAC address different from the MAC address of the transmission source is not included in the probe response, the control unit 10 determines the wireless communication terminal which is the transmission source of the probe response including the processing method information representing the same processing method as the processing method determined in step S1021 as the counterpart with which to perform the participation setup process (step S105). Information of the wireless communication terminal determined in step S1051 or S105 is stored in the storage unit 13.

Subsequently to step S1051 or S105, the control unit 10 controls the components in the wireless communication terminal such that the wireless communication terminal executes the participation setup process with the wireless communication terminal, which its own wireless communication terminal has determined as the participation setup process counterpart, according to the processing method determined by its own wireless communication terminal (step S106). In the participation setup process, the participation setup process request is transmitted from the wireless communication terminal that is not participating in the ad-hoc network to the wireless communication terminal that is participating in the ad-hoc network, various messages necessary to receive the network setting information are then exchanged between the transmission source of the participation setup process request and the transmission destination, and thereafter the wireless communication terminal that is not participating in the ad-hoc network receives the network setting information. In the PBC method, a fixed value defined in WPS is used as identification information for the participation setup process. In the PIN method, a PIN code generated by the wireless communication terminal that is not participating in the ad-hoc network is used as identification information for the participation setup process.

After the participation setup process ends, the control unit 10 determines whether or not the participation setup process was successful (step S107). Here, when it is determined that the participation setup process was successful, the control unit 10 clears the information of the processing method determined in step S1021 from the storage unit 13 (step S1071), and clears the information of the wireless communication terminal determined in step S1051 or S105 from the storage unit 13 (step S1072).

Then, the control unit 10 executes an authentication process based on the network setting information acquired through the participation setup process as necessary, and participates in the ad-hoc network in which the wireless communication terminal that was the counterpart of the participation setup process is participating (step S108). The participation in the ad-hoc network is realized by causing its own TSF timer to be synchronized with the value of the TSF timer included in the received probe response. Subsequently, the process proceeds to step S120 of FIG. 3.

In addition, when it is determined that the participation setup process was unsuccessful, the control unit 10 determines whether or not the participation setup processes with all the wireless communication terminals of the transmission sources of the probe responses stored in the storage unit 13 in step S1031 were unsuccessful (step S109). Here, when the participation setup processes with all the wireless communication terminals of the transmission sources of the probe responses stored in the storage unit 13 in step S1031 were unsuccessful, the control unit 10 determines it as an error and thus ends the process. When there is a wireless communication terminal that has not executed the participation setup process among all the wireless communication terminals of the transmission sources of the probe responses stored in the storage unit 13 in step S1031, the control unit 10 determines the wireless communication terminal that has not executed the participation setup process as the counterpart with which to perform the participation setup process (step S110). The information of the wireless communication terminal determined in step S110 is stored in the storage unit 13. Subsequently, the process proceeds to step S106.

FIGS. 3 and 4 mainly illustrate an operation of the wireless communication terminal that is participating in the ad-hoc network. First, the control unit 10 starts transmission of the probe response to the reception of the probe request (step S120). Then, when the probe request is received, the control unit 10 controls the wireless communication unit 14 such that the probe response including information set to be included in the probe response is transmitted at this point in time. Through this control of the control unit 10, the wireless communication unit 14 transmits the probe response. The probe response includes a MAC address of the wireless communication terminal transmitting the probe response in addition to the information set to be included in the probe response.

Then, the control unit 10 determines whether or not a predetermined event for starting the participation setup process has been received (step S121). The predetermined event determined in step S121 refers to an event for starting the participation setup process, which is generated by its own wireless communication terminal according to the PBC method or the PIN method.

Here, when it is determined that the predetermined event has not been received, the process proceeds to step S123. However, when it is determined that the predetermined event has been received, the control unit 10 determines a processing method of the participation setup process according to the type of the received event (step S122). The method of determining the processing method is the same as the method of determining the processing method in step S1021. Here, information of the determined processing method is stored in the storage unit 13. Subsequently, the control unit 10 changes the setting of the wireless communication terminal such that the processing method information representing the processing method determined in step S122 is included in (set to) the probe response to be transmitted subsequently (step S1221).

Then, the control unit 10 determines whether or not the probe request including the processing method information representing the same processing method as the processing method determined by its own wireless communication terminal has been received (step S123). Here, when it is determined that the probe request including the processing method information representing the same processing method as the processing method determined by its own wireless communication terminal has not been received, or when the processing method has not been determined by its own wireless communication terminal, the process proceeds to step S128 of FIG. 4. However, when it is determined that the probe request including the processing method information representing the same processing method as the processing method determined by its own wireless communication terminal has been received, the control unit 10 determines whether or not its own wireless communication terminal is in the process of executing the participation setup process (step S124).

Here, when it is determined that its own wireless communication terminal is not in the process of executing the participation setup process, the control unit 10 determines the wireless communication terminal, which is the transmission source of the probe request including the processing method information representing the same processing method as the processing method determined by its own wireless communication terminal, as the counterpart with which to perform the participation setup process (step S125). The information of the wireless communication terminal determined in step S125 is stored in the storage unit 13. Then, the process proceeds to step S128 of FIG. 4.

However, when it is determined that its own wireless communication terminal is in the process of executing the participation setup process, the control unit 10 determines whether or not the trigger signal for requesting another wireless communication terminal to receive the event has been transmitted (whether or not there is the case in which the trigger signal has been transmitted) (step S126). Here, when it is determined that the trigger signal has been transmitted, the process proceeds to step S128 of FIG. 4. However, when it is determined that the trigger signal has not been transmitted, the control unit 10 controls the wireless communication unit 14 such that the trigger signal including the processing method information representing the processing method determined by its own wireless communication terminal is transmitted to any one wireless communication terminal in the ad-hoc network in which its own wireless communication terminal is participating. Through this control of the control unit 10, the wireless communication unit 14 transmits the trigger signal (step S127). As the trigger signal is transmitted, a flag representing a state in which the trigger signal has been transmitted is stored in the storage unit 13. Further, a flag representing a state in which the trigger signal has been received is stored in the storage unit 13 of the wireless communication terminal that has received the trigger signal.

Subsequently, the control unit 10 determines whether or not the participation setup process request has been received (step S128). Here, when it is determined that the participation setup process request has not been received, the process proceeds to step S133. However, when it is determined that the participation setup process request has been received, the control unit 10 determines whether or not the wireless communication terminal which is the transmission source of the participation setup process request is identical to the participation setup process counterpart determined by its own wireless communication terminal (step S129).

Here, when it is determined that the wireless communication terminal which is the transmission source of the participation setup process request is identical to the participation setup process counterpart determined by its own wireless communication terminal, the control unit 10 controls the components in the wireless communication terminal such that the wireless communication terminal executes the participation setup process with the wireless communication terminal, which its own wireless communication terminal has determined as the participation setup process counterpart, according to the processing method determined by its own wireless communication terminal (step S130). Then, the process proceeds to step S133. However, when it is determined that the wireless communication terminal which is the transmission source of the participation setup process request is not identical to the participation setup process counterpart determined by its own wireless communication terminal, the control unit 10 determines that the trigger signal has been received (whether or not the trigger signal has been received in the past) (step S131).

Here, when it is determined that the trigger signal has not been received, the process proceeds to step S133. However, when it is determined that the trigger signal has been received, the control unit 10 determines whether or not the processing method represented by the processing method information included in the participation setup process request is identical to the same processing method as the processing method determined by its own wireless communication terminal (step S132). Here, when it is determined that the processing method represented by the processing method information included in the participation setup process request is identical to the same processing method as the processing method determined by its own wireless communication terminal, the process proceeds to step S130. However, when it is determined that the processing method represented by the processing method information included in the participation setup process request is not identical to the same processing method as the processing method determined by its own wireless communication terminal or when the processing method has not yet been determined by its own wireless communication terminal, the control unit 10 determines whether or not the trigger signal has been received (step S133).

Here, when it is determined that the trigger signal has not been received, the process proceeds to step S135. However, when it is determined that the trigger signal has been received, the control unit 10 receives the event for starting the participation setup process, and determines the processing method represented by the processing method information included in the trigger signal as the processing method of the participation setup process (step S134). Here, information of the determined processing method is stored in the storage unit 13. Then, the control unit 10 determines whether or not the participation setup process has been completed (step S135).

At this time, when the participation setup process is being executed or when the participation setup process has not yet been executed, the process proceeds to step S123 of FIG. 3. However, when it is determined that the participation setup process has been completed, the control unit 10 changes the setting of the wireless communication terminal such that the processing method information is deleted from the probe response to be subsequently transmitted (step S136). Then, the control unit 10 clears the processing method information stored in the storage unit 13 (step S137), clears the information of the wireless communication terminal, which is the counterpart with which the participation setup process was performed, stored in the storage unit 13 (step S138), and clears the flag representing the state in which the trigger signal has been transmitted and the flag representing the state in which the trigger signal has been received, which are stored in the storage unit 13 (step S139). The flag representing the state in which the trigger signal has been transmitted and the flag representing the state in which the trigger signal has been received may not be cleared when the flags have already been cleared. Then, the process proceeds to step S121 of FIG. 3.

Next, the operations of the wireless communication terminals according to FIGS. 2 to 4 will be described. FIG. 5 illustrates the operations of the wireless communication terminals in accordance with the first operation example. FIG. 5 illustrates an example in which, in a state in which there is already an ad-hoc network, and a wireless communication terminal 1 and a wireless communication terminal 2 are in the ad-hoc network, in order to cause a non-participating wireless communication terminal 3 and a non-participating wireless communication terminal 4 to participate in the ad-hoc network, the user pushes down the buttons of the wireless communication terminal 1 and the wireless communication terminal 3, and thereafter the user pushes the button of the wireless communication terminal 4.

The wireless communication terminal (the wireless communication terminals 1 and 2 of FIG. 5) has information of an identifier (MAC address) of another wireless communication terminal belonging to the same the ad-hoc network. In this example, the wireless communication terminal 1 has information of the MAC address of the wireless communication terminal 2, and the wireless communication terminal 2 has information of the MAC address of the wireless communication terminal 1. When the participation setup process is performed between the wireless communication terminal 1 and the wireless communication terminal 2, each wireless communication terminal can acquire the MAC address of the wireless communication terminal of the participation setup process counterpart. Alternatively, it is possible to acquire the MAC address of another wireless communication terminal by a beacon or the like transmitted from each wireless communication terminal that is participating in the ad-hoc network.

When the button is pushed down in the wireless communication terminal 1 (corresponding to step S121), the wireless communication terminal 1 determines the PBC method as the processing method (corresponding to step S122), and sets the processing method information of the PBC method to the probe response (corresponding to step S1221). Further, when the button is pushed down in the non-participating wireless communication terminal 3 (corresponding to step S102), the wireless communication terminal 3 determines the PBC method as the processing method (corresponding to step S1021), and transmits the probe request including the processing method information of the PBC method (corresponding to step S103).

When the probe request including the processing method information representing the same processing method as its own processing method (the PBC method) is received from the wireless communication terminal 3, the wireless communication terminal 1 replies with the probe response including the processing method information of the PBC method (corresponding to step S120). Further, since the button has not been pushed down in the wireless communication terminal 2, the wireless communication terminal 2 replies with the probe response to which the processing method information is not set (corresponding to step S120).

Upon receiving the probe responses from the wireless communication terminals 1 and 2, the wireless communication terminal 3 stores the received probe responses (corresponding to step S1031). The probe response from the wireless communication terminal 1 includes the processing method information representing the same processing method as the processing method (the PBC method) of the wireless communication terminal 3 (corresponding to step S104) but does not include a MAC address other than the MAC address of the wireless communication terminal 1 (corresponding to step S1041). Thus, the wireless communication terminal 3 determines the wireless communication terminal 1 as the participation setup process counterpart (corresponding to step S105).

Since the wireless communication terminal 1 has received the probe request including the processing method information representing the same processing method as the processing method (the PBC method) of its own terminal from the wireless communication terminal 3, the wireless communication terminal 1 determines the wireless communication terminal 3 as the participation setup process counterpart (corresponding to step S125). The wireless communication terminal 3 transmits the participation setup process request to the wireless communication terminal 1, and thus the participation setup process is executed between the wireless communication terminal 3 and the wireless communication terminal 1 (corresponding to steps S106 and S130).

In addition, when the button is pushed down in the non-participating wireless communication terminal 4 while the participation setup process is being executed between the wireless communication terminal 3 and the wireless communication terminal 1 (corresponding to step S102), the wireless communication terminal 4 determines the PBC method as the processing method (corresponding to step S1021), and transmits the probe request including the processing method information of the PBC method (corresponding to step S103).

When the probe request including the processing method information representing the same processing method as its own processing method (the PBC method) is received from the wireless communication terminal 4, the wireless communication terminal 1 replies with the probe response including the processing method information of the PBC method (corresponding to step S120). At this time, when the button has not been pushed down in the wireless communication terminal 2, the wireless communication terminal 2 replies with the probe response to which the processing method information is not set (corresponding to step S120).

Since the wireless communication terminal 1 has received the probe request including the processing method information representing the same processing method as the processing method (the PBC method) of its own terminal (corresponding to step S123) and is executing the participation setup process with the wireless communication terminal 3 (corresponding to step S124), the wireless communication terminal 1 transmits the trigger signal to the wireless communication terminal 2 (corresponding to step S127). The wireless communication terminal 2 receives the trigger signal and then determines the PBC method as the processing method (corresponding to step S134).

Since the wireless communication terminal 4 has received the probe response including the processing method information of the PBC method from the wireless communication terminal 1, the wireless communication terminal 4 determines the wireless communication terminal 1 as the participation setup process counterpart (corresponding to step S105), and starts the participation setup process with the wireless communication terminal 1 (corresponding to step S106). However, since the participation setup process is being executed between the wireless communication terminal 1 and the wireless communication terminal 3, the participation setup process between the wireless communication terminal 4 and the wireless communication terminal 1 fails (corresponding to step S107). For this reason, the wireless communication terminal 4 determines the wireless communication terminal 2 as the participation setup process counterpart (corresponding to step S110), and starts the participation setup process with the wireless communication terminal 2 (corresponding to step S106). In the participation setup process, the wireless communication terminal 4 transmits the participation setup process request to the wireless communication terminal 2.

In addition, in the wireless communication terminal 2, since the button has not been pushed down and the predetermined event has not been received, the processing method of the participation setup process remains undetermined. For this reason, it is determined in step S123 that the probe request including the processing method information representing the same processing method as the processing method determined by its own wireless communication terminal has not been received, and the participation setup process counterpart remains undetermined. When the wireless communication terminal 2 receives the participation setup process request from the wireless communication terminal 4 (corresponding to step S128), the process proceeds to step S131 because the participation setup process counterpart remains undetermined.

Since the wireless communication terminal 2 has received the trigger signal (corresponding to step S131) and the processing method information included in the participation setup process request is identical to the processing method information of the PBC method determined in step S134 (corresponding to step S132), the wireless communication terminal 2 starts the participation setup process with the wireless communication terminal 4 (corresponding to step S130). When the participation setup process is successful, the wireless communication terminal 4 participates in the ad-hoc network (corresponding to step S108). The above description has been made in connection with the example in which the participation setup process is performed according to the PBC method, but the participation setup process may be performed according to the PIN method.

As described above, the user can execute the participation setup process by pushing down the button of the wireless communication terminal 4 without waiting for completion of the participation setup process between the wireless communication terminal 1 and the wireless communication terminal 3, and thus the time the user is tied down is reduced. Further, since the participation setup process between the wireless communication terminal 1 and the wireless communication terminal 3 can be executed in parallel with the participation setup process between the wireless communication terminal 2 and the wireless communication terminal 4, the time taken until all non-participating wireless communication terminals are participating can be reduced.

Second Operation Example

Figure 6:
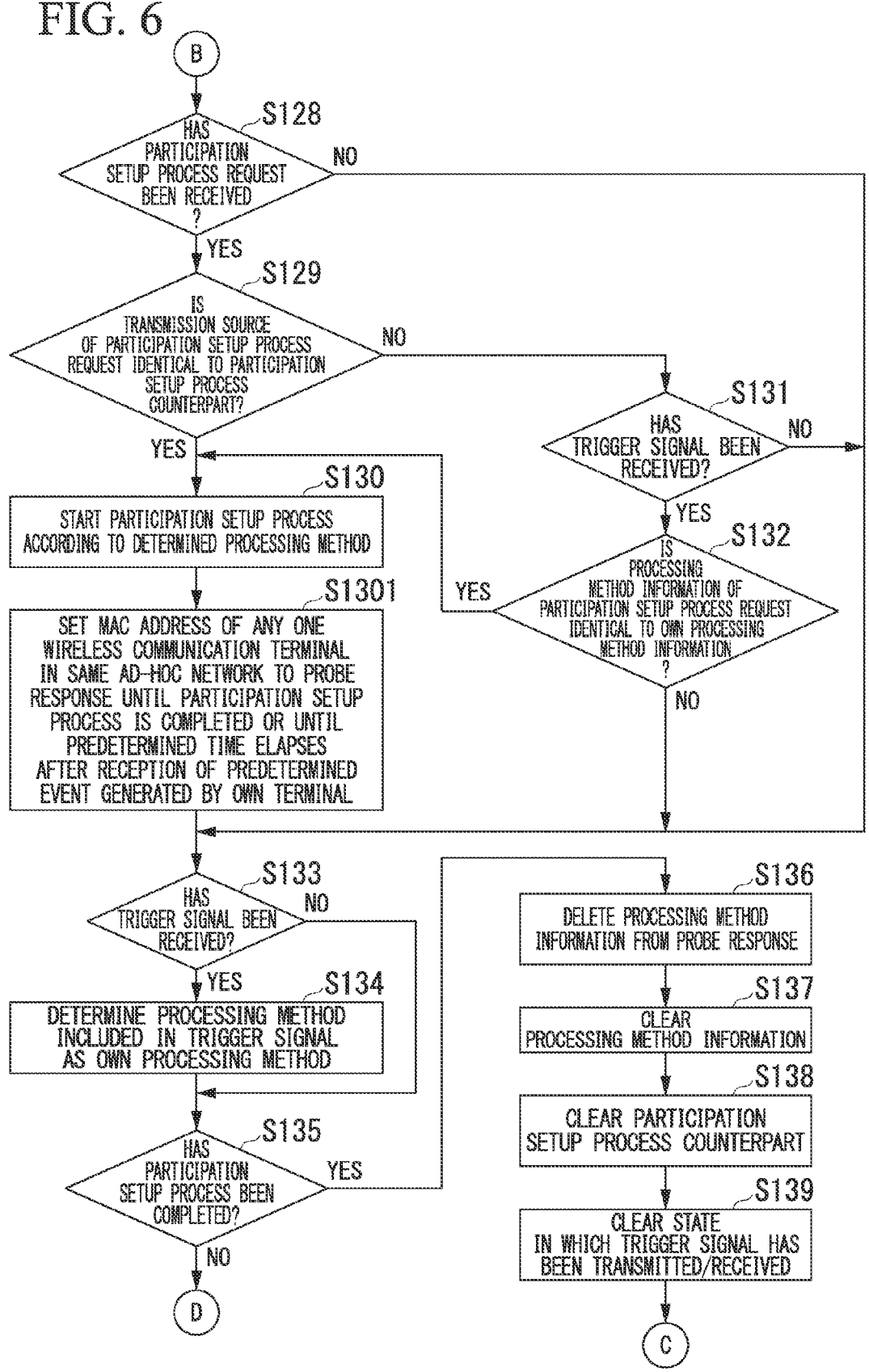
FIG. 6 is a flowchart illustrating an operation process of a wireless communication terminal in accordance with a preferred embodiment of the present invention.
Figure 7:
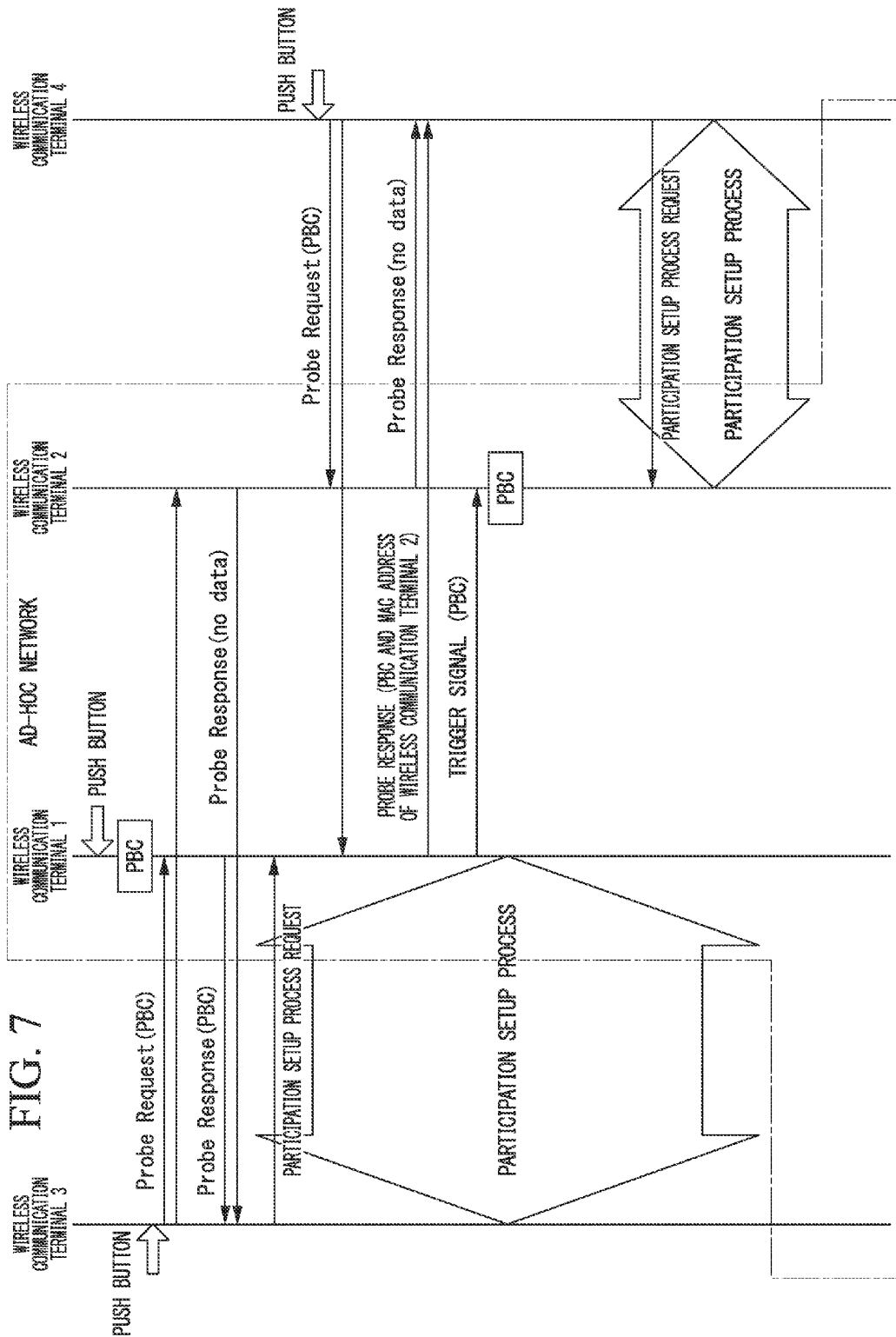
FIG. 7 is a sequence diagram illustrating a communication process between wireless communication terminals in accordance with a preferred embodiment of the present invention.

Next, a second operation example will be described with reference to FIGS. 6 and 7. FIG. 6 illustrates a detailed processing procedure of a wireless communication terminal. FIG. 7 illustrates a concrete example of an operation according to FIG. 6.

FIG. 6 corresponds to FIG. 4, and mainly illustrates an operation of the wireless communication terminal that is participating in the ad-hoc network. The same operation as the operation illustrated in FIGS. 2 and 3 is performed in the second operation example. In the following, the description will proceed in connection with parts different from the first operation example.

In FIG. 6, the control unit 10 changes the setting of the wireless communication terminal such that a MAC address of any wireless communication terminal that is participating in the same ad-hoc network as the ad-hoc network in which its own wireless communication terminal is participating is included in (set to) the probe response to be transmitted until the participation setup process is completed after the participation setup process starts in step S130 or until a predetermined time elapses after reception of the predetermined event in step S121 (step S1301). In the participation setup process performed in the past, it is possible to acquire a MAC address of another wireless communication terminal by information of a counterpart wireless communication terminal or a beacon or the like transmitted from each wireless communication terminal.

Then, the process proceeds to step S133. The remaining operation is the same as the operation described in the first operation example. Further, in step S127 of FIG. 3, the trigger signal is transmitted to the wireless communication terminal having the MAC address set in step S1301.

FIG. 7 illustrates operations of wireless communication terminals in accordance with the second operation example. FIG. 7 illustrates an example in which, in a state in which there is already an ad-hoc network, and a wireless communication terminal 1 and a wireless communication terminal 2 are in the ad-hoc network, in order to cause a non-participating wireless communication terminal 3 and a non-participating wireless communication terminal 4 to participate in the ad-hoc network, the user pushes down the buttons of the wireless communication terminal 1 and the wireless communication terminal 3, and thereafter the user pushes the button of the wireless communication terminal 4.

The operation until the buttons of the wireless communication terminal 1 and the wireless communication terminal 3 are pushed down and the participation setup process by the PBC method is executed between the wireless communication terminal 1 and the wireless communication terminal 3 is the same as in FIG. 5. When the button is pushed down in the non-participating wireless communication terminal 4 while the participation setup process is being executed between the wireless communication terminal 3 and the wireless communication terminal 1 (corresponding to step S102), the wireless communication terminal 4 determines the PBC method as the processing method (corresponding to step S1021), and transmits the probe request including the processing method information of the PBC method (corresponding to step S103).

When the probe request including the processing method information representing the same processing method as its own processing method (the PBC method) is received from the wireless communication terminal 4, the wireless communication terminal 1 replies with the probe response including the processing method information of the PBC method and the MAC address of the wireless communication terminal 2 (corresponding to steps S120 and S1301). Further, since the button has not been pushed down in the wireless communication terminal 2, the wireless communication terminal 2 replies with the probe response to which the processing method information is not set (corresponding to step S120).

Since the wireless communication terminal 1 has received the probe request including the processing method information representing the same processing method as the processing method (the PBC method) of its own terminal (corresponding to step S123) and is executing the participation setup process with the wireless communication terminal 3 (corresponding to step S124), the wireless communication terminal 1 transmits the trigger signal to the wireless communication terminal 2 (corresponding to step S127). The wireless communication terminal 2 receives the trigger signal and then determines the PBC method as the processing method (corresponding to step S134).

Since the wireless communication terminal 4 has received the probe response including the processing method information of the PBC method and the MAC address of the wireless communication terminal 2 from the wireless communication terminal 1, the wireless communication terminal 4 determines the wireless communication terminal 2 as the participation setup process counterpart (corresponding to step S1051), and starts the participation setup process with the wireless communication terminal 2 (corresponding to step S106). In the participation setup process, the wireless communication terminal 4 transmits the participation setup process request to the wireless communication terminal 2.

In addition, in the wireless communication terminal 2, since the button has not been pushed down and the predetermined event has not been received, the processing method of the participation setup process remains undetermined. For this reason, it is determined in step S123 that the probe request including the processing method information representing the same processing method as the processing method determined by its own wireless communication terminal has not been received, and the participation setup process counterpart remains undetermined. When the wireless communication terminal 2 receives the participation setup process request from the wireless communication terminal 4 (corresponding to step S128), the process proceeds to step S131 since the participation setup process counterpart remains undetermined.

Since the wireless communication terminal 2 has received the trigger signal (corresponding to step S131) and the processing method information included in the participation setup process request is identical to the processing method information of the PBC method determined in step S134 (corresponding to step S132), the wireless communication terminal 2 starts the participation setup process with the wireless communication terminal 4 (corresponding to step S130). Here, when the participation setup process is successful, the wireless communication terminal 4 participates in the ad-hoc network (corresponding to step S108). The above description has been made in connection with the example in which the participation setup process is performed according to the PBC method, but the participation setup process may be performed according to the PIN method.

As described above, the wireless communication terminal 4 transmits the participation setup process request to the wireless communication terminal 2 having the MAC address notified by the probe response from the wireless communication terminal 1, and executes the participation setup process with the wireless communication terminal 2. Thus, a situation in which the wireless communication terminal 4 transmits the participation setup process request to the wireless communication terminal 1 in vain and so the participation setup process fails does not occur, and thus the time taken until all non-participating wireless communication terminal are participating can be reduced.

Third Operation Example

Figure 8:
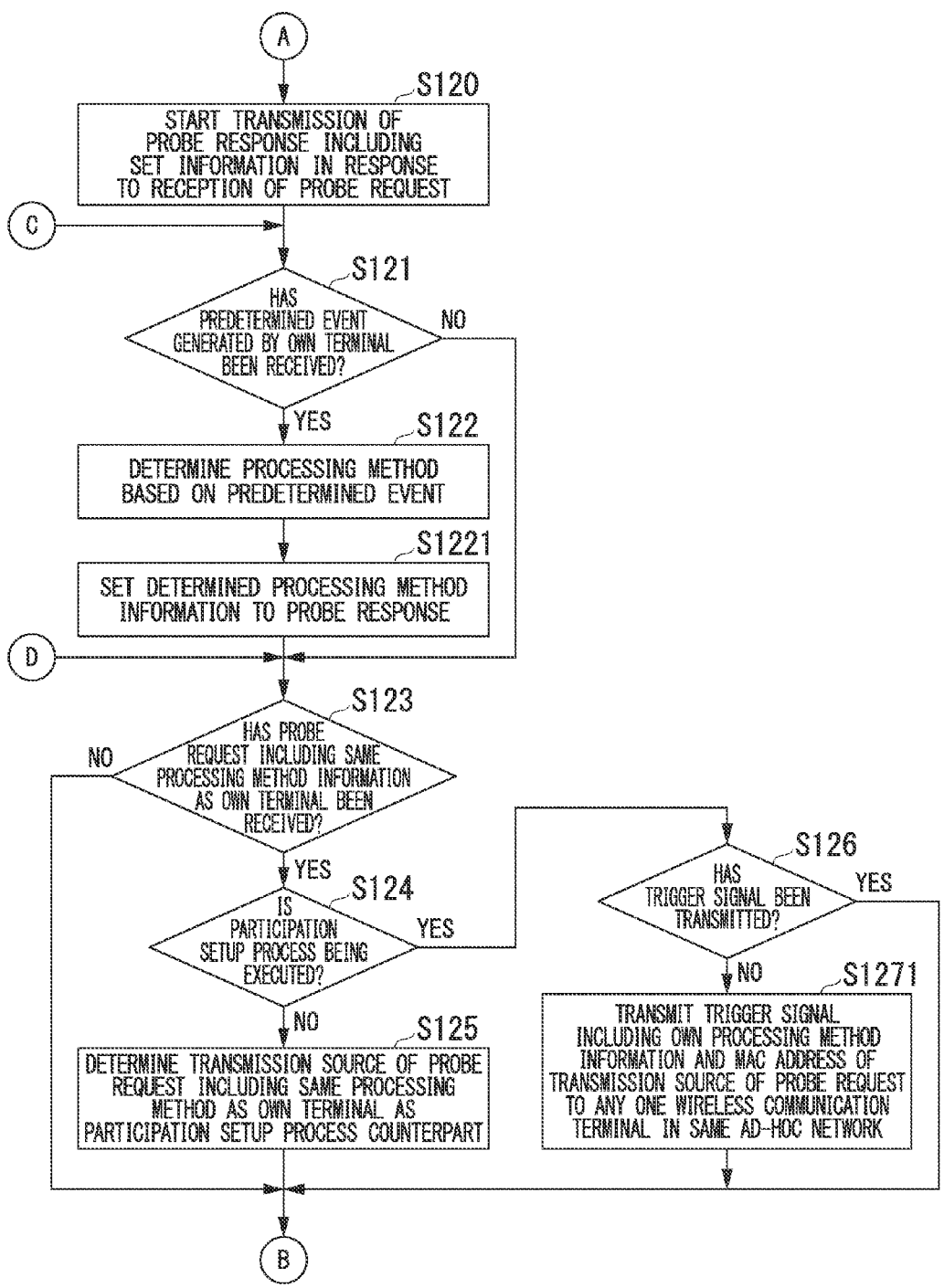
FIG. 8 is a flowchart illustrating an operation process of a wireless communication terminal in accordance with a preferred embodiment of the present invention.
Figure 9:
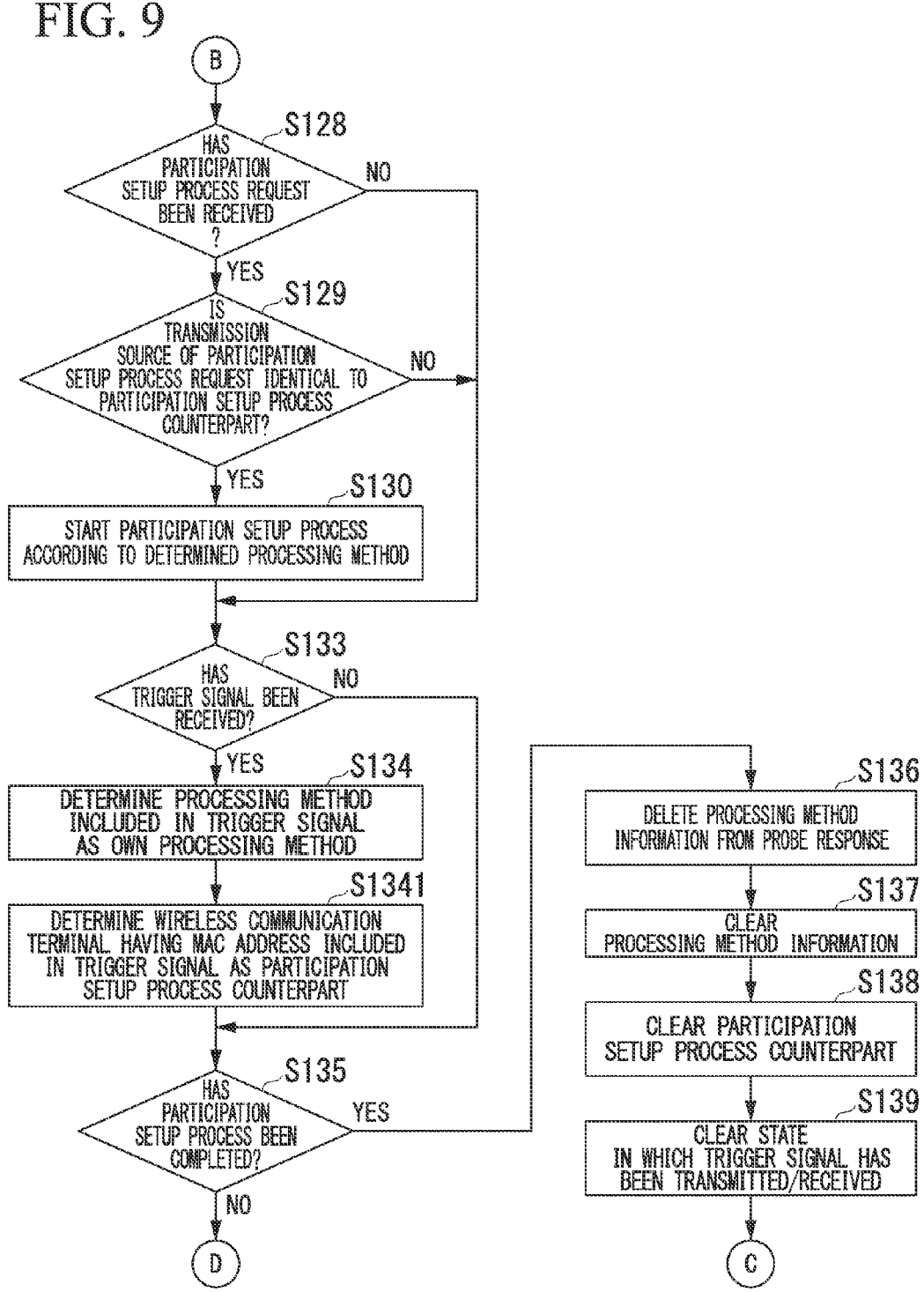
FIG. 9 is a flowchart illustrating an operation process of a wireless communication terminal in accordance with a preferred embodiment of the present invention.
Figure 10:
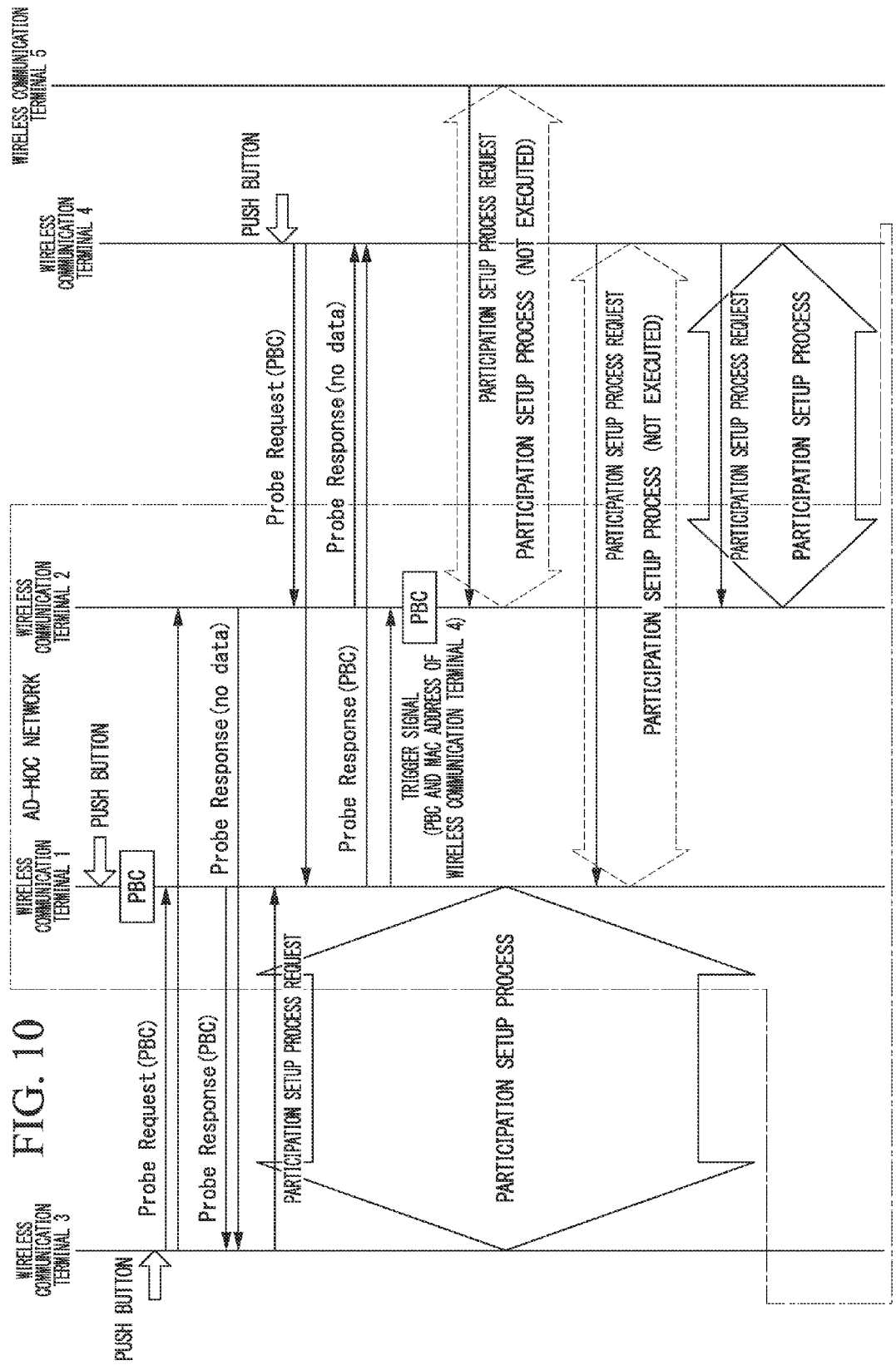
FIG. 10 is a sequence diagram illustrating a communication process between wireless communication terminals in accordance with a preferred embodiment of the present invention.

Next, a third operation example will be described with reference to FIGS. 8 to 10. FIGS. 8 and 9 illustrate a detailed processing procedure of a wireless communication terminal. FIG. 10 illustrates a concrete example of an operation according to FIGS. 8 and 9.

FIGS. 8 and 9 correspond to FIGS. 3 and 4, respectively, and mainly illustrate an operation of the wireless communication terminal that is participating in the ad-hoc network. The same operation as the operation illustrated in FIG. 2 is performed in the third operation example. In the following, the description will proceed in connection with parts different from the first operation example.

In FIG. 8, when it is determined that the trigger signal has not been transmitted (step S126), the control unit 10 controls the wireless communication unit 14 such that the trigger signal including the processing method information representing the processing method determined by its own wireless communication terminal and the MAC address of the transmission source of the probe request is transmitted to any one wireless communication terminal in the ad-hoc network in which its own wireless communication terminal is participating. Through this control of the control unit 10, the wireless communication unit 14 transmits the trigger signal (step S1271).

In FIG. 9, steps S131 and S132 of FIG. 4 are deleted, and when it is determined in step S129 that the wireless communication terminal which is the transmission source of the participation setup process request is not identical to the participation setup process counterpart determined by its own wireless communication terminal, the process proceeds to step S133. Further, when it is determined in step S133 that the trigger signal has been received, the control unit 10 determines the processing method (step S134), and determines the wireless communication terminal having the MAC address included in the trigger signal as the counterpart with which to perform the participation setup process (step S1341). The remaining operation is the same as the operation described in the first operation example.

FIG. 10 illustrates operations of wireless communication terminals in accordance with the third operation example. FIG. 10 illustrates an example in which, in a state in which there is already an ad-hoc network, and a wireless communication terminal 1 and a wireless communication terminal 2 are in the ad-hoc network, in order to cause a non-participating wireless communication terminal 3 and a non-participating wireless communication terminal 4 to participate in the ad-hoc network, the user pushes down the buttons of the wireless communication terminal 1 and the wireless communication terminal 3, and thereafter the user pushes the button of the wireless communication terminal 4. In this example, a non-participating wireless communication terminal 5 transmits the participation setup process request while the participation setup process is being executed between the wireless communication terminal 1 and the wireless communication terminal 3.

The operation until the buttons of the wireless communication terminal 1 and the wireless communication terminal 3 are pushed down and the participation setup process by the PBC method is executed between the wireless communication terminal 1 and the wireless communication terminal 3 is the same as in FIG. 5. When the button is pushed down in the non-participating wireless communication terminal 4 while the participation setup process is being executed between the wireless communication terminal 3 and the wireless communication terminal 1 (corresponding to step S102), the wireless communication terminal 4 determines the PBC method as the processing method (corresponding to step S1021), and transmits the probe request including the processing method information of the PBC method (corresponding to step S103).

When the probe request including the processing method information representing the same processing method as its own processing method (the PBC method) is received from the wireless communication terminal 4, the wireless communication terminal 1 replies with the probe response including the processing method information of the PBC method (corresponding to step S120). Further, since the button has not been pushed down in the wireless communication terminal 2, the wireless communication terminal 2 replies with the probe response to which the processing method information is not set (corresponding to step S120).

Since the wireless communication terminal 1 has received the probe request including the processing method information representing the same processing method as the processing method (the PBC method) of its own terminal (corresponding to step S123) and is executing the participation setup process with the wireless communication terminal 3 (corresponding to step S124), the wireless communication terminal 1 transmits the trigger signal to the wireless communication terminal 2 (corresponding to step S127). The wireless communication terminal 2 receives the trigger signal, then determines the PBC method as the processing method (corresponding to step S134), and determines the wireless communication terminal 4 having the MAC address included in the trigger signal as the participation setup process counterpart (corresponding to step S1341).

Next, let us assume that the wireless communication terminal 5 has transmitted the participation setup process request to the wireless communication terminal 2 without transmitting the probe request. At this time, since the wireless communication terminal 2 has received the participation setup process request from the wireless communication terminal 5 (corresponding to step S128) but has determined the wireless communication terminal 4 having the MAC address included in the trigger signal as the participation setup process counterpart, the process proceeds to step S133. For this reason, the participation setup process is not executed between the wireless communication terminal 2 and the wireless communication terminal 5.

Since the wireless communication terminal 4 has received the probe response including the processing method information of the PBC method from the wireless communication terminal 1, the wireless communication terminal 4 determines the wireless communication terminal 1 as the participation setup process counterpart (corresponding to step S105), and executes the participation setup process (corresponding to step S106). However, since the participation setup process is being executed between the wireless communication terminal 1 and the wireless communication terminal 3, the participation setup process between the wireless communication terminal 4 and the wireless communication terminal 1 fails (corresponding to step S107).

Since the participation setup process has failed between the wireless communication terminal 4 and the wireless communication terminal 1, the wireless communication terminal 4 determines the wireless communication terminal 2 as the participation setup process counterpart (corresponding to step S110), and executes the participation setup process (corresponding to step S106). Here, when the participation setup process is successful, the wireless communication terminal 4 participates in the ad-hoc network (corresponding to step S108). The above description has been made in connection with the example in which the participation setup process is performed according to the PBC method, but the participation setup process may be performed according to the PIN method.

As described above, when the wireless communication terminal 2 receives the unexpected participation setup process request from the wireless communication terminal 5, it is possible to prevent the wireless communication terminal 2 from performing the participation setup process with the wireless communication terminal 5. For this reason, time is not unnecessarily expended until the wireless communication terminal 4 which tries to participate in the ad-hoc network participates in the ad-hoc network, and thus the time taken until all non-participating wireless communication terminals are participating can be reduced.

Fourth Operation Example

Figure 11:
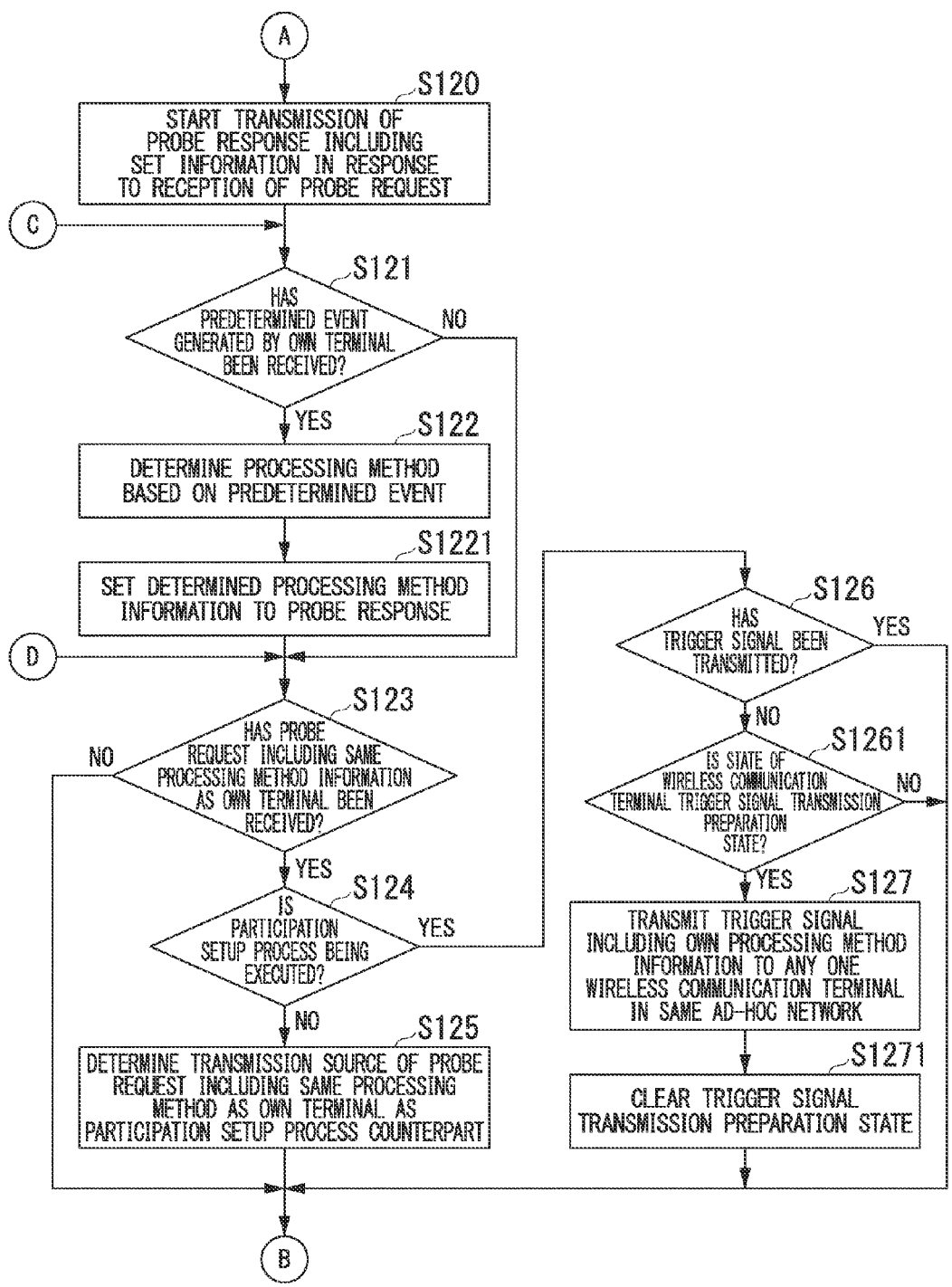
FIG. 11 is a flowchart illustrating an operation process of a wireless communication terminal in accordance with a preferred embodiment of the present invention.
Figure 12:
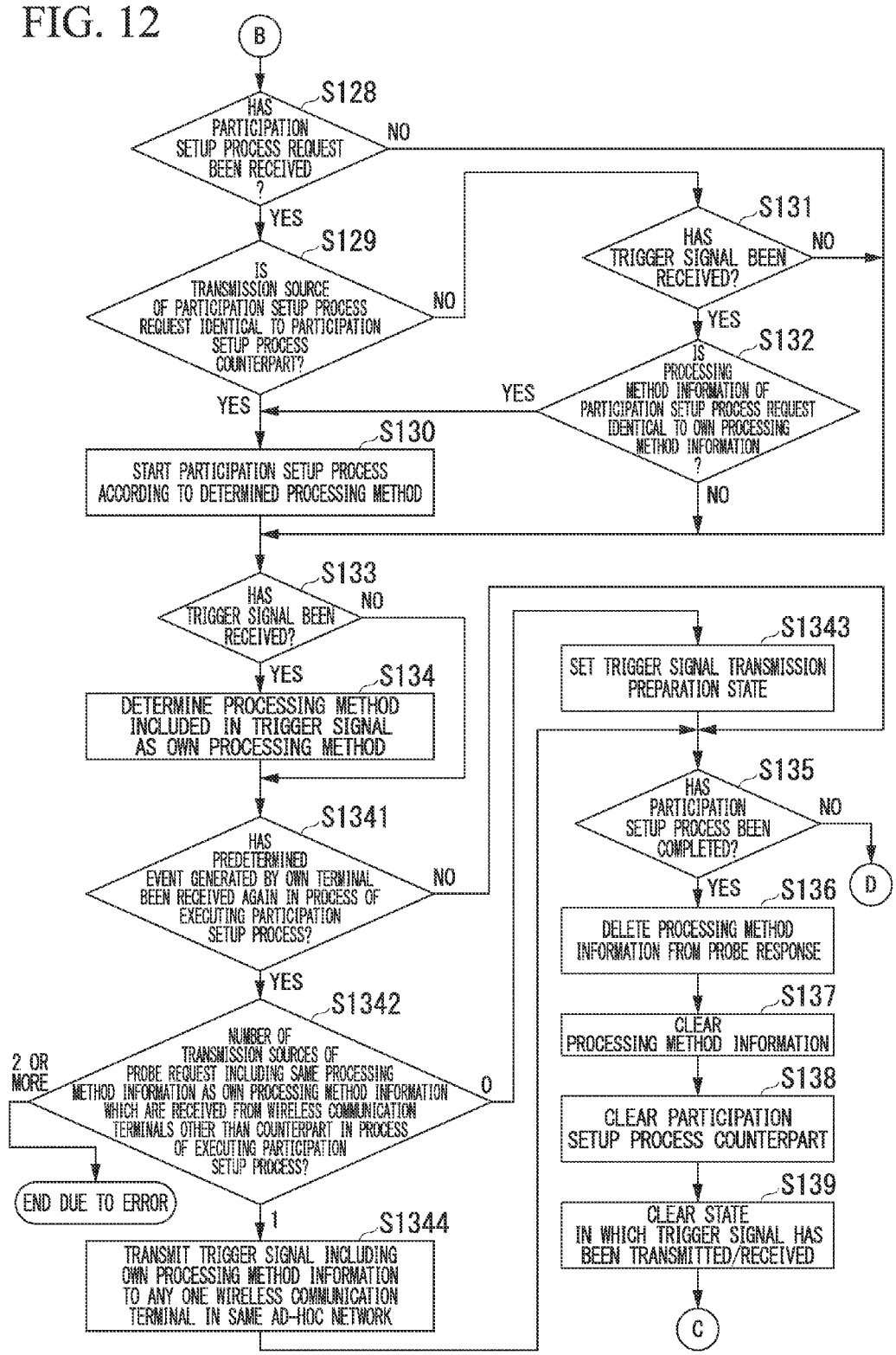
FIG. 12 is a flowchart illustrating an operation process of a wireless communication terminal in accordance with a preferred embodiment of the present invention.
Figure 13:
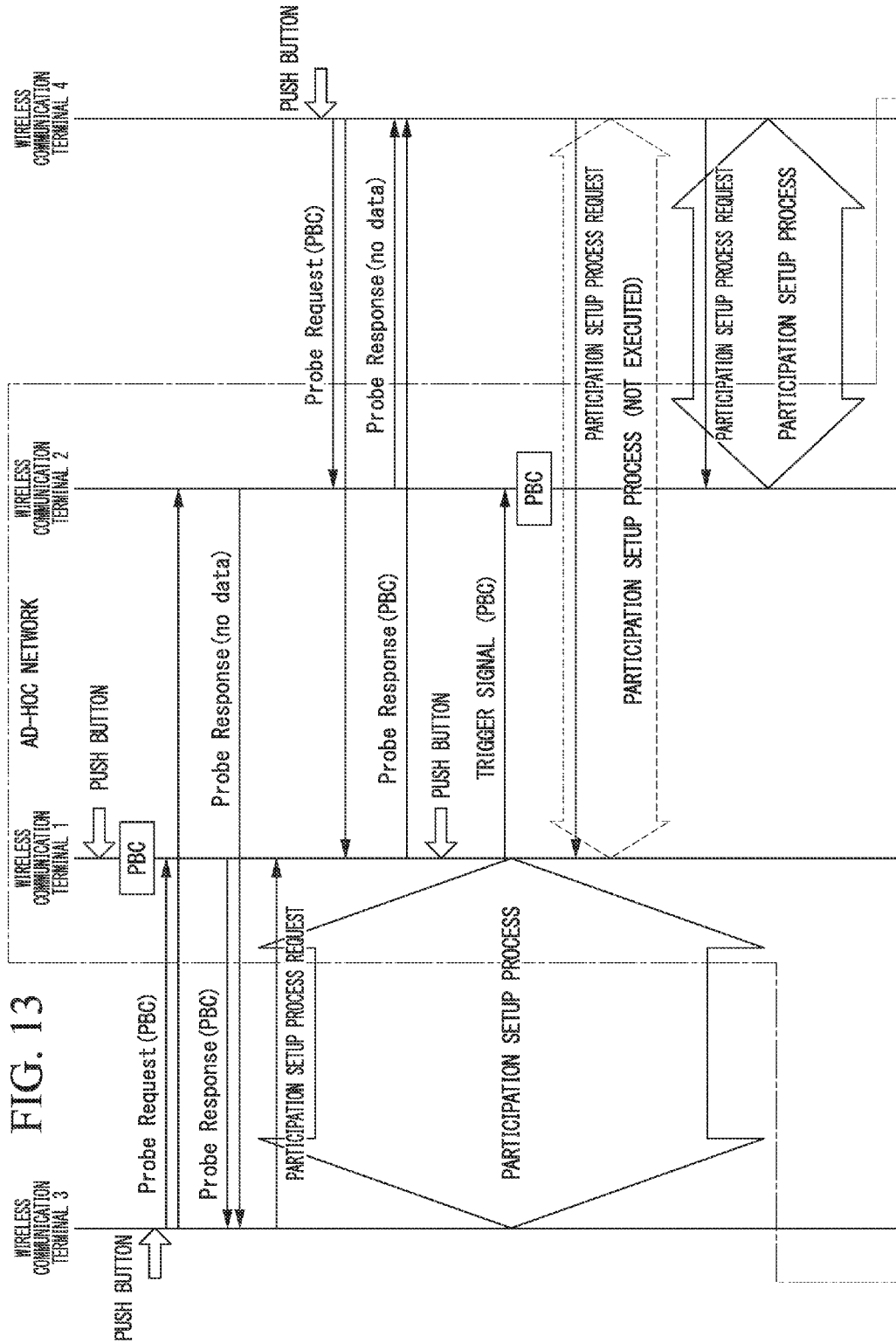
FIG. 13 is a sequence diagram illustrating a communication process between wireless communication terminals in accordance with a preferred embodiment of the present invention.

Next, a fourth operation example will be described with reference to FIGS. 11 to 13. FIGS. 11 and 12 illustrate a detailed processing procedure of a wireless communication terminal. FIG. 13 illustrates a concrete example of an operation according to FIGS. 11 and 12.

FIGS. 11 and 12 correspond to FIGS. 3 and 4, respectively, and mainly illustrate an operation of the wireless communication terminal that is participating in the ad-hoc network. The same operation as the operation illustrated in FIG. 2 is performed in the fourth operation example. In the following, the description will proceed in connection with parts different from the first operation example.

In FIG. 11, when it is determined in step S126 that the trigger signal has not been transmitted, the control unit 10 determines whether or not a state of the wireless communication terminal is a trigger signal transmission preparation state (step S1261). The trigger signal transmission preparation state will be described later. Here, when it is determined that the state of the wireless communication terminal is the trigger signal transmission preparation state, the process proceeds to step S127. In step S127, the trigger signal is transmitted. After transmission of the trigger signal, the control unit 10 clears a flag representing that the state of the wireless communication terminal is the trigger signal transmission preparation state, which is stored in the storage unit 13 (step S1271). Then, the process proceeds to step S128. However, when it is determined that the state of the wireless communication terminal is not the trigger signal transmission preparation state, the process proceeds to step S128.

In FIG. 12, when it is determined in step S133 that the trigger signal has not been received or when it is determined in step S133 that the trigger signal has been received and then the processing method is determined in step S134, the control unit 10 determines whether or not a predetermined event for starting the participation setup process has been received in the process of executing the participation setup process (step S1341). The predetermined event determined in step S1341 refers to the event for starting the participation setup process, which is generated by its own wireless communication terminal according to the PBC method or the PIN method, and is an event which is received again separately from an event received before the participation setup process starts.

Here, when the predetermined event has not been received in the process of executing the participation setup process, the process proceeds to step S135. However, when the predetermined event has been received in the process of executing the participation setup process, the control unit 10 determines the number of wireless communication terminals which are transmission sources of the probe request including the processing method information representing the same processing method as the processing method determined by its own wireless communication terminal, which are received from wireless communication terminals other than the counterpart in the process of executing the participation setup process (step S1342).

Here, when the number of wireless communication terminals is two (2) or more, the control unit 10 determines it as an error and ends the process. However, when the number of wireless communication terminals is zero (0), the control unit 10 sets the trigger signal transmission preparation state as the state of the wireless communication terminal (step S1343). The flag representing that the state of the wireless communication terminal is the trigger signal transmission preparation state is stored in the storage unit 13. Then, the process proceeds to step S135.

Further, when the number of wireless communication terminals is one (1), the control unit 10 controls the wireless communication unit 14 such that the trigger signal including the processing method information representing the processing method determined by its own wireless communication terminal is transmitted to any one wireless communication terminal in the ad-hoc network in which its own wireless communication terminal is participating. Through this control of the control unit 10, the wireless communication unit 14 transmits the trigger signal (step S1344). As the trigger signal is transmitted, a flag representing a state in which the trigger signal has been transmitted is stored in the storage unit 13. Further, a flag representing a state in which the trigger signal has been received is stored in the storage unit 13 of the wireless communication terminal that has received the trigger signal. Then, the process proceeds to step S135. The remaining operation is the same as the operation described in the first operation example.

FIG. 13 illustrates operations of wireless communication terminals in accordance with the fourth operation example. FIG. 13 illustrates an example in which, in a state in which there is already an ad-hoc network, and a wireless communication terminal 1 and a wireless communication terminal 2 are in the ad-hoc network, in order to cause a non-participating wireless communication terminal 3 and a non-participating wireless communication terminal 4 to participate in the ad-hoc network, the user pushes down the buttons of the wireless communication terminal 1 and the wireless communication terminal 3, and thereafter the user pushes the buttons of the wireless communication terminal 1 and the wireless communication terminal 4.

The operation until the buttons of the wireless communication terminal 1 and the wireless communication terminal 3 are pushed down and the participation setup process by the PBC method is executed between the wireless communication terminal 1 and the wireless communication terminal 3 is the same as in FIG. 5. When the button is pushed down in the non-participating wireless communication terminal 4 while the participation setup process is being executed between the wireless communication terminal 3 and the wireless communication terminal 1 (corresponding to step S102), the wireless communication terminal 4 determines the PBC method as the processing method (corresponding to step S1021), and transmits the probe request including the processing method information of the PBC method (corresponding to step S103).

When the probe request including the processing method information representing the same processing method as its own processing method (the PBC method) is received from the wireless communication terminal 4, the wireless communication terminal 1 replies with the probe response including the processing method information of the PBC method (corresponding to step S120). Further, since the button has not been pushed down in the wireless communication terminal 2, the wireless communication terminal 2 replies with the probe response to which the processing method information is not set (corresponding to step S120).

The wireless communication terminal 1 has received the probe request including the processing method information representing the same processing method as the processing method (the PBC method) of its own terminal (corresponding to step S123) and is executing the participation setup process with the wireless communication terminal 3 (corresponding to step S124), but since the wireless communication terminal 1 has not transmitted the trigger signal (corresponding to step S126) but is not in the trigger signal transmission preparation state (corresponding to step S1261), the trigger signal is not transmitted to the wireless communication terminal 2 at this point in time.

When the button is pushed down again in the wireless communication terminal 1 in the process of executing the participation setup process with the wireless communication terminal 3 (corresponding to step S1341), since the probe request has been received from the wireless communication terminal 4 in the process of executing the participation setup process, the wireless communication terminal 1 transmits the trigger signal to the wireless communication terminal 2 (corresponding to step S1344). The wireless communication terminal 2 receives the trigger signal and then determines the PBC method as the processing method (corresponding to step S134).

Since the wireless communication terminal 4 has received the probe response including the processing method information of the PBC method from the wireless communication terminal 1, the wireless communication terminal 4 determines the wireless communication terminal 1 as the participation setup process counterpart (corresponding to step S105), and executes the participation setup process (corresponding to step S106). However, since the participation setup process is being executed between the wireless communication terminal 1 and the wireless communication terminal 3, the participation setup process between the wireless communication terminal 4 and the wireless communication terminal 1 fails (corresponding to step S107). For this reason, the wireless communication terminal 4 determines the wireless communication terminal 2 as the participation setup process counterpart (corresponding to step S110), and starts the participation setup process with the wireless communication terminal 2 (corresponding to step S106). In the participation setup process, the wireless communication terminal 4 transmits the participation setup process request to the wireless communication terminal 2.

Since the wireless communication terminal 2 has received the trigger signal (corresponding to step S131) and the processing method information included in the participation setup process request is identical to the processing method information of the PBC method determined in step S134 (corresponding to step S132), the wireless communication terminal 2 starts the participation setup process with the wireless communication terminal 4 (corresponding to step S130). Here, when the participation setup process is successful, the wireless communication terminal 4 participates in the ad-hoc network (corresponding to step S108).

The above description has been made in connection with the example in which, when the wireless communication terminal 1 is in the process of executing the participation setup process, the button is pushed down in the wireless communication terminal 4, so that the probe request is transmitted from the wireless communication terminal 4, and thereafter the button is pushed down again in the wireless communication terminal 1. In addition, even when the wireless communication terminal 1 is in the process of executing the participation setup process, the button is pushed down again in the wireless communication terminal 1, and thereafter the button is pushed down in the wireless communication terminal 4, so that the probe request is transmitted from the wireless communication terminal 4, and the participation setup process is executed between the wireless communication terminal 2 and the wireless communication terminal 4.

In this case, when the button is pushed down again in the wireless communication terminal 1 (corresponding to step S1341), the state of the wireless communication terminal 1 is set to the trigger signal transmission preparation state (corresponding to step S1343). Thereafter, when the probe request is received from the wireless communication terminal 4 (corresponding to step S123), since the wireless communication terminal 1 is executing the participation setup process with the wireless communication terminal 3 (corresponding to step S124), has not transmitted the trigger signal (corresponding to step S126), and is in the trigger signal transmission preparation state (corresponding to step S1261), the wireless communication terminal 1 transmits the trigger signal to the wireless communication terminal 2 (corresponding to step S127). Subsequently, the participation setup process is similarly executed between the wireless communication terminal 2 and the wireless communication terminal 4, and thus the wireless communication terminal 4 participates in the ad-hoc network. The above description has been made in connection with the example in which the participation setup process is performed according to the PBC method, but the participation setup process may be performed according to the PIN method.

As described above, the user can execute the participation setup process by pushing down the buttons of the wireless communication terminal 1 and the wireless communication terminal 4 without waiting for completion of the participation setup process between the wireless communication terminal 1 and the wireless communication terminal 3. Since the wireless communication terminal 2 can accept the participation setup process when the button is pushed down in the wireless communication terminal 1 and the trigger signal is transmitted, it is possible to reduce the possibility that the wireless communication terminal 2 will execute the participation setup process with a wireless communication terminal other than the wireless communication terminal 4 due to an unexpected participation setup process request from the wireless communication terminal other than the wireless communication terminal 4. For this reason, time is not unnecessarily expended until the wireless communication terminal 4 which tries to participate in the ad-hoc network participates in the ad-hoc network, and thus the time taken until all non-participating wireless communication terminals are participating can be reduced.

Fifth Operation Example

Figure 14:
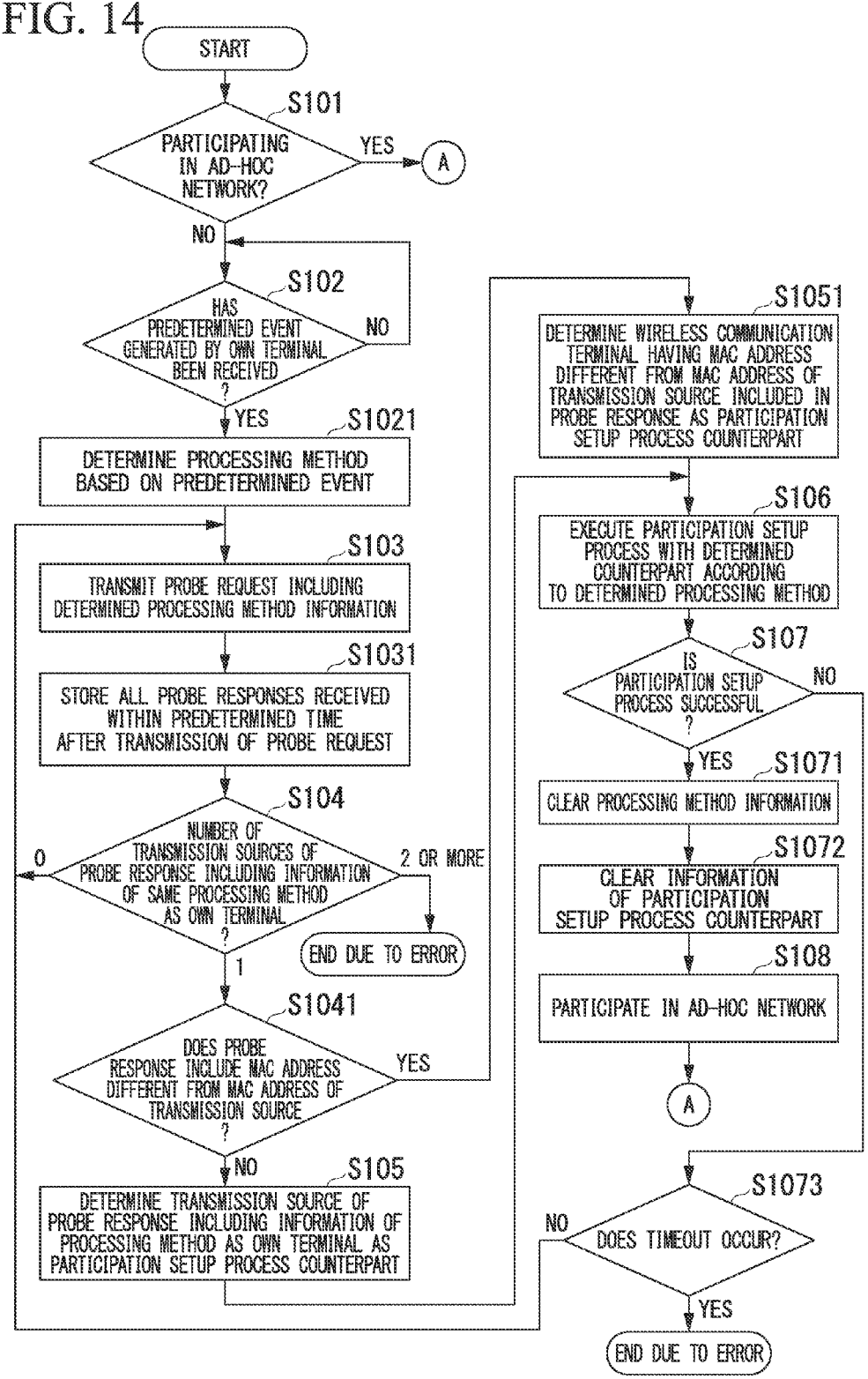
FIG. 14 is a flowchart illustrating an operation process of a wireless communication terminal in accordance with a preferred embodiment of the present invention.
Figure 15:
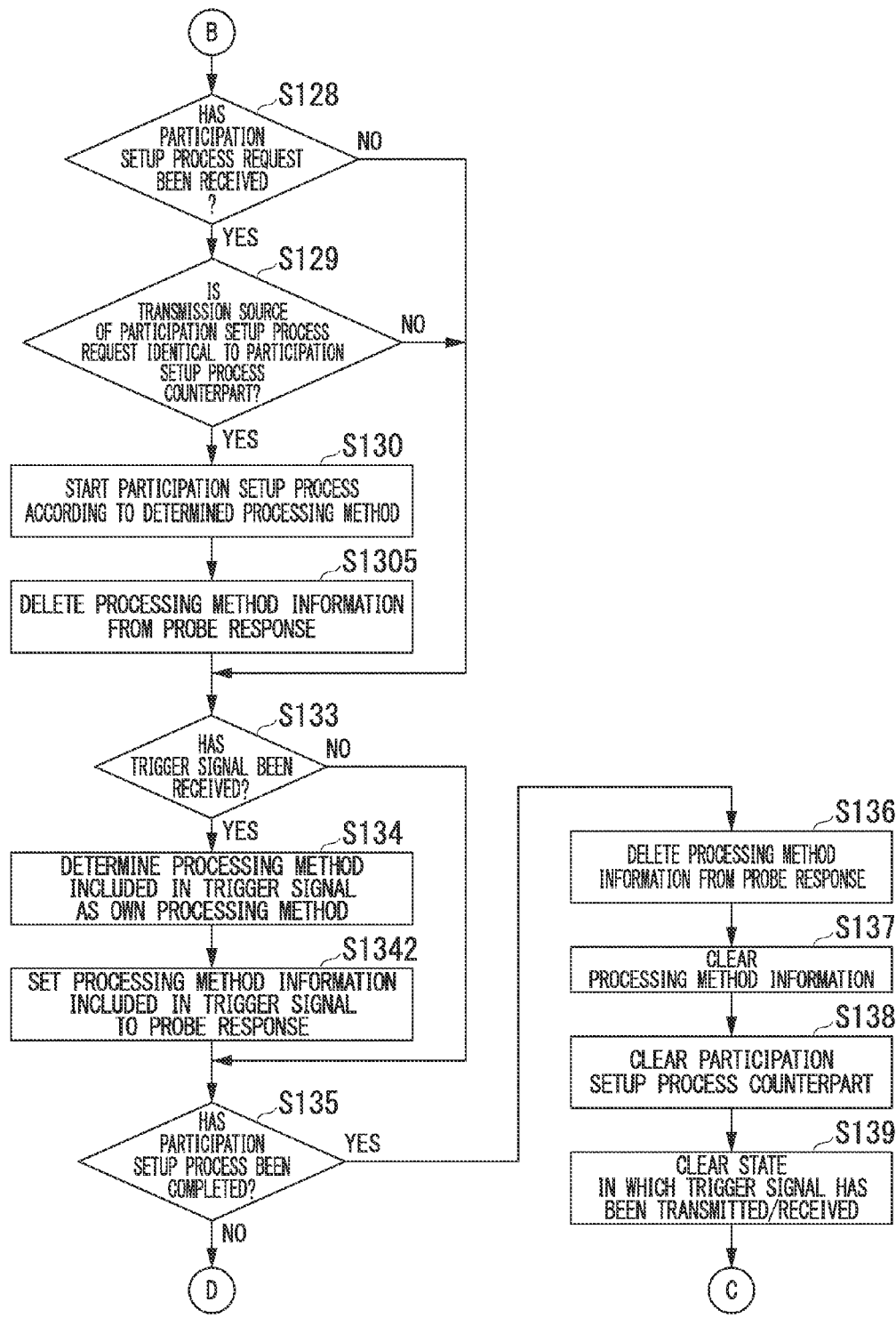
FIG. 15 is a flowchart illustrating an operation process of a wireless communication terminal in accordance with a preferred embodiment of the present invention.
Figure 16:
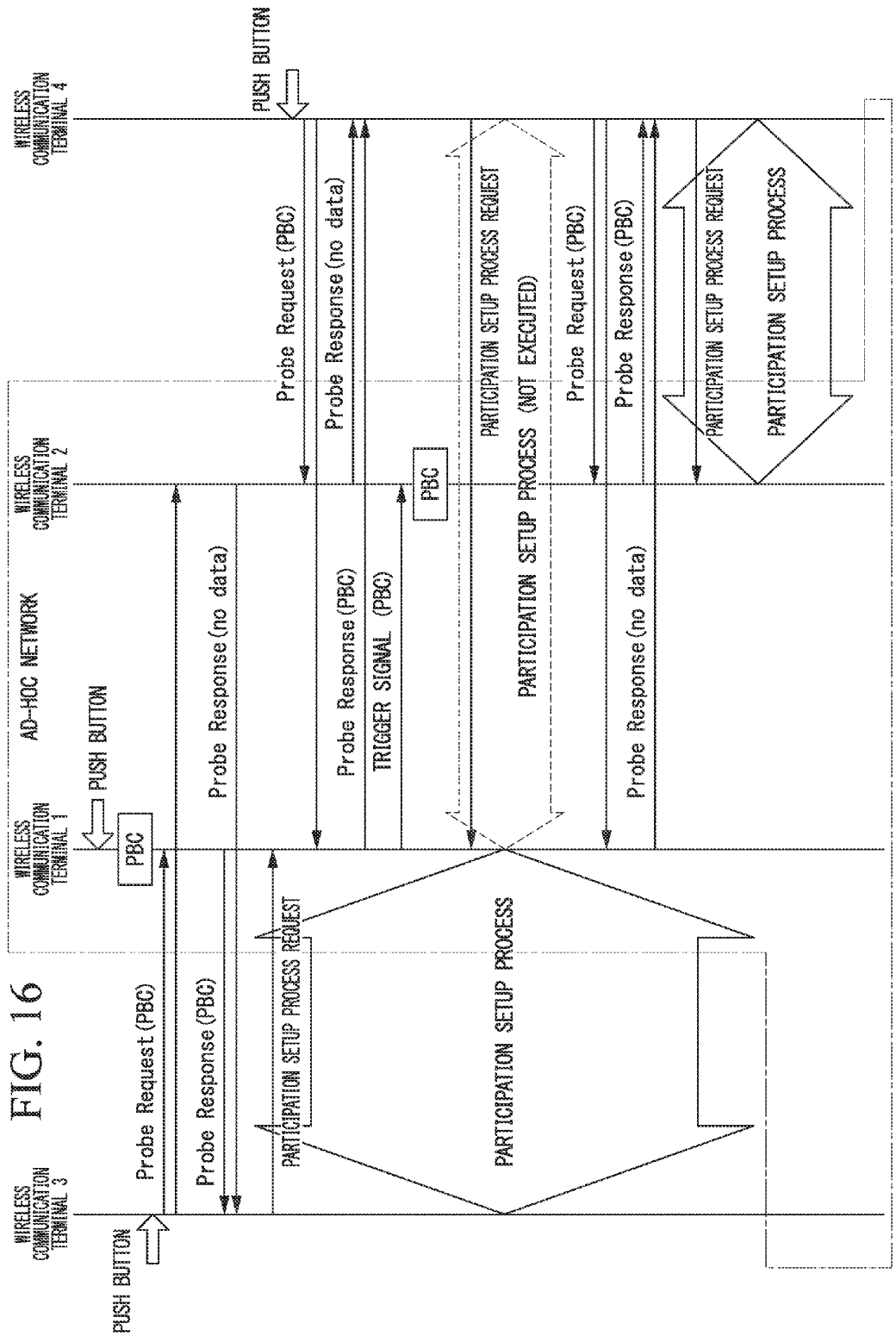
FIG. 16 is a sequence diagram illustrating a communication process between wireless communication terminals in accordance with a preferred embodiment of the present invention.

Next, a fifth operation example will be described with reference to FIGS. 14 to 16. FIGS. 14 and 15 illustrate a detailed processing procedure of a wireless communication terminal. FIG. 16 illustrates a concrete example of an operation according to FIGS. 14 and 15.

FIGS. 14 and 15 correspond to FIGS. 2 and 4, respectively, and mainly illustrate an operation of the wireless communication terminal that is participating in the ad-hoc network. The same operation as the operation illustrated in FIG. 3 is performed in the fifth operation example. In the following, the description will proceed in connection with parts different from the first operation example.

In FIG. 14, when it is determined in step S102 that the predetermined event has been received, the control unit 10 starts measurement of time. When it is determined in step S107 that the participation setup process is unsuccessful, the control unit 10 determines whether or not the measured time has exceeded a predetermined length of time and thus timeout has occurred (step S1073). Here, when it is determined that timeout has occurred, the control unit 10 determines it as an error and thus ends the process. However, when it is determined that timeout has not occurred, the process returns to step S103. Through this process, the wireless communication terminal that is not participating in the ad-hoc network can retransmit the probe request when the participation setup process has failed.

In FIG. 15, steps S131 and S132 of FIG. 4 are deleted, and when it is determined in step S129 that the wireless communication terminal which is the transmission source of the participation setup process request is not identical to the participation setup process counterpart determined by its own wireless communication terminal, the process proceeds to step S133. Further, after the participation setup process starts in step S130, the control unit 10 changes the setting of the wireless communication terminal such that the processing method information is deleted from the probe response to be transmitted subsequently (step S1305). Then, the process proceeds to step S133.

Further, after the processing method is determined in step S134, the control unit 10 changes the setting of the wireless communication terminal such that the same processing method information as the processing method information included in the trigger signal is included in (set to) the probe response to be transmitted subsequently (step S1342). Then, the process proceeds to step S135. The remaining operation is the same as the operation described in the first operation example.

FIG. 16 illustrates operations of wireless communication terminals in accordance with the fifth operation example. FIG. 16 illustrates an example in which, in a state in which there is already an ad-hoc network, and a wireless communication terminal 1 and a wireless communication terminal 2 are in the ad-hoc network, in order to cause a non-participating wireless communication terminal 3 and a non-participating wireless communication terminal 4 to participate in the ad-hoc network, the user pushes down the buttons of the wireless communication terminal 1 and the wireless communication terminal 3, and thereafter the user pushes the button of the wireless communication terminal 4.

The buttons of the wireless communication terminal 1 and the wireless communication terminal 3 are pushed down, and thus the participation setup process according to the PBC method is executed between the wireless communication terminal 1 and the wireless communication terminal 3. Further, the button is pushed down in the wireless communication terminal 4, and so the probe request is transmitted. The wireless communication terminal 1 transmits the trigger signal to the wireless communication terminal 2 based on the probe request. The wireless communication terminal 4 starts the participation setup process with the wireless communication terminal 1, but since the participation setup process is being executed between the wireless communication terminal 1 and the wireless communication terminal 3, the participation setup process between the wireless communication terminal 4 and the wireless communication terminal 1 fails. The above operation is the same as in FIG. 5.

Here, when the participation setup process fails (corresponding to step S107), if timeout does not occur (corresponding to step S1073), the wireless communication terminal 4 retransmits the probe request including the processing method information of the PBC method (corresponding to step S103). After the participation setup process with the wireless communication terminal 3 starts, the wireless communication terminal 1 deletes the processing method information from the information to be included in the probe response (corresponding to step S1305). Then, when the probe request is received from the wireless communication terminal 4, the wireless communication terminal 1 replies with the probe response to which the processing method information is not set (corresponding to step S120). Further, after reception of the trigger signal, the wireless communication terminal 2 sets the processing method information of the PBC method included in the trigger signal to the probe response (corresponding to step S1342). Then, when the probe request is received from the wireless communication terminal 4, the wireless communication terminal 2 replies with the probe response including the processing method information of the PBC method (corresponding to step S120).

When the probe responses are received from the wireless communication terminals 1 and 2, the wireless communication terminal 4 stores the received probe responses (corresponding to step S1031). The probe response from the wireless communication terminal 2 includes the processing method information representing the same processing method as the processing method (the PBC method) of the wireless communication terminal 4 (corresponding to step S104) but does not include the MAC address other than the MAC address of the wireless communication terminal 2 (corresponding to step S1041). Thus, the wireless communication terminal 4 determines the wireless communication terminal 2 as the participation setup process counterpart (corresponding to step S105).

Since the wireless communication terminal 2 has received the probe request including the processing method information representing the same processing method as the processing method (the PBC method) of its own terminal from the wireless communication terminal 4, the wireless communication terminal 2 determines the wireless communication terminal 4 as the participation setup process counterpart (corresponding to step S125). The wireless communication terminal 4 transmits the participation setup process request to the wireless communication terminal 2, and the participation setup process is executed between the wireless communication terminal 4 and the wireless communication terminal 2 (corresponding to steps S106 and S130). Here, when the participation setup process is successful, the wireless communication terminal 4 participates in the ad-hoc network (corresponding to step S108). The above description has been made in connection with the example in which the participation setup process is performed according to the PBC method, but the participation setup process may be performed according to the PIN method.

As described above, when the participation setup process fails, the wireless communication terminal 4 retransmits the probe request, and executes the participation setup process with the wireless communication terminal 2 based on the probe response received from the wireless communication terminal 2. Thus, a situation in which the wireless communication terminal 4 transmits the participation setup process request to the wireless communication terminal 1 in vain and so the participation setup process fails does not occur, and thus the time taken until all non-participating wireless communication terminals are participating can be reduced.

Sixth Operation Example

Figure 17:
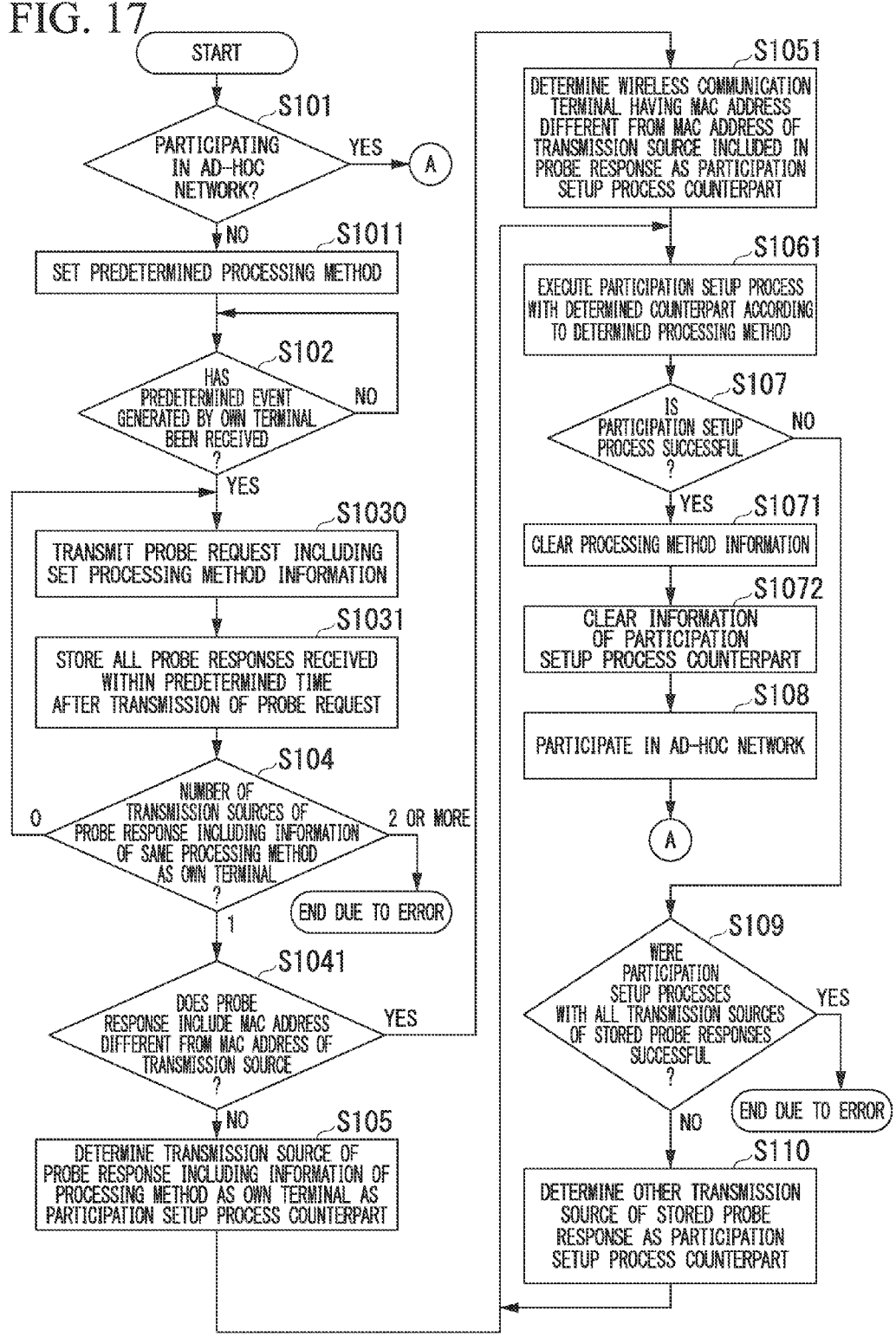
FIG. 17 is a flowchart illustrating an operation process of a wireless communication terminal in accordance with a preferred embodiment of the present invention.
Figure 18:
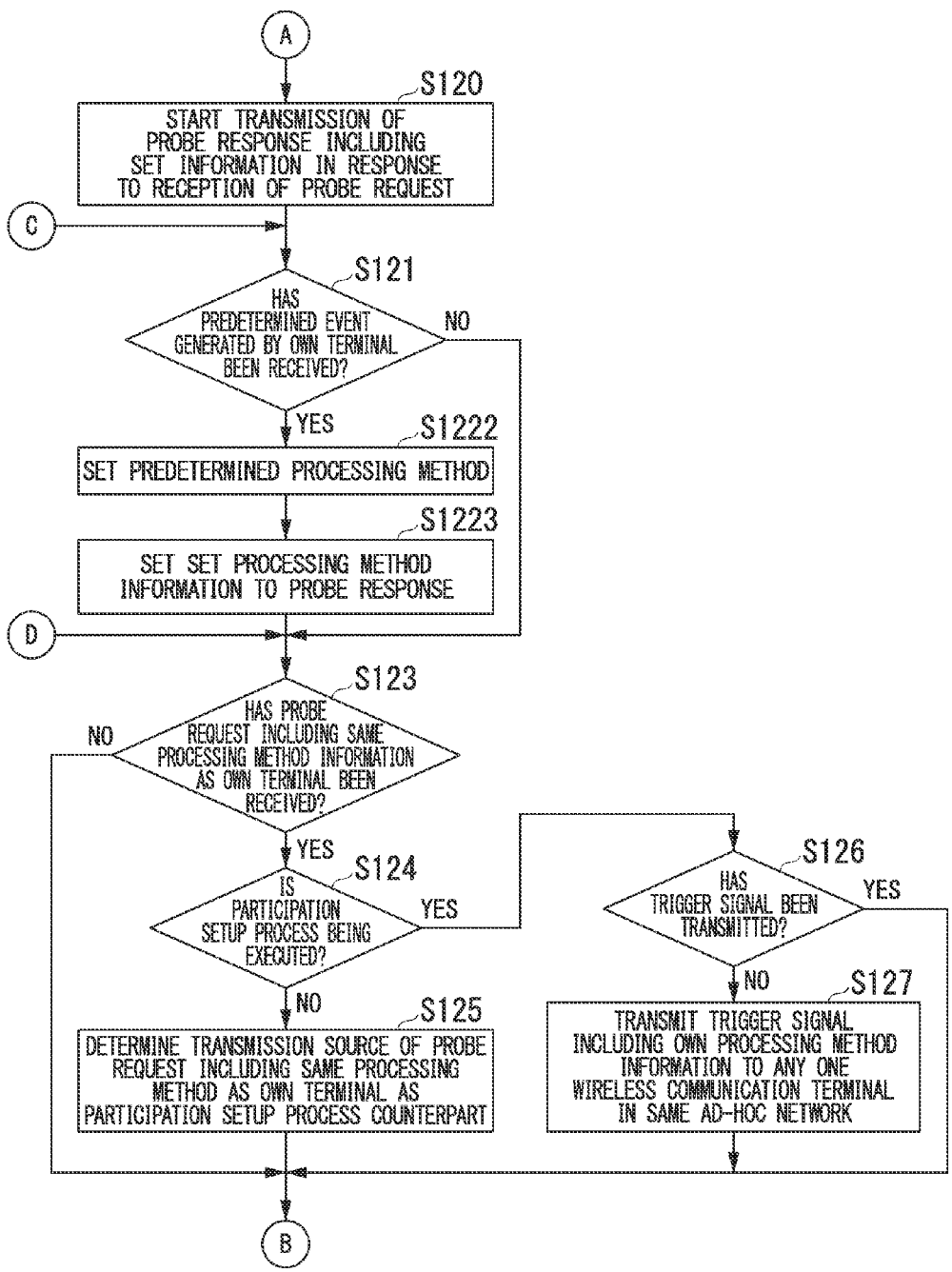
FIG. 18 is a flowchart illustrating an operation process of a wireless communication terminal in accordance with a preferred embodiment of the present invention.
Figure 19:
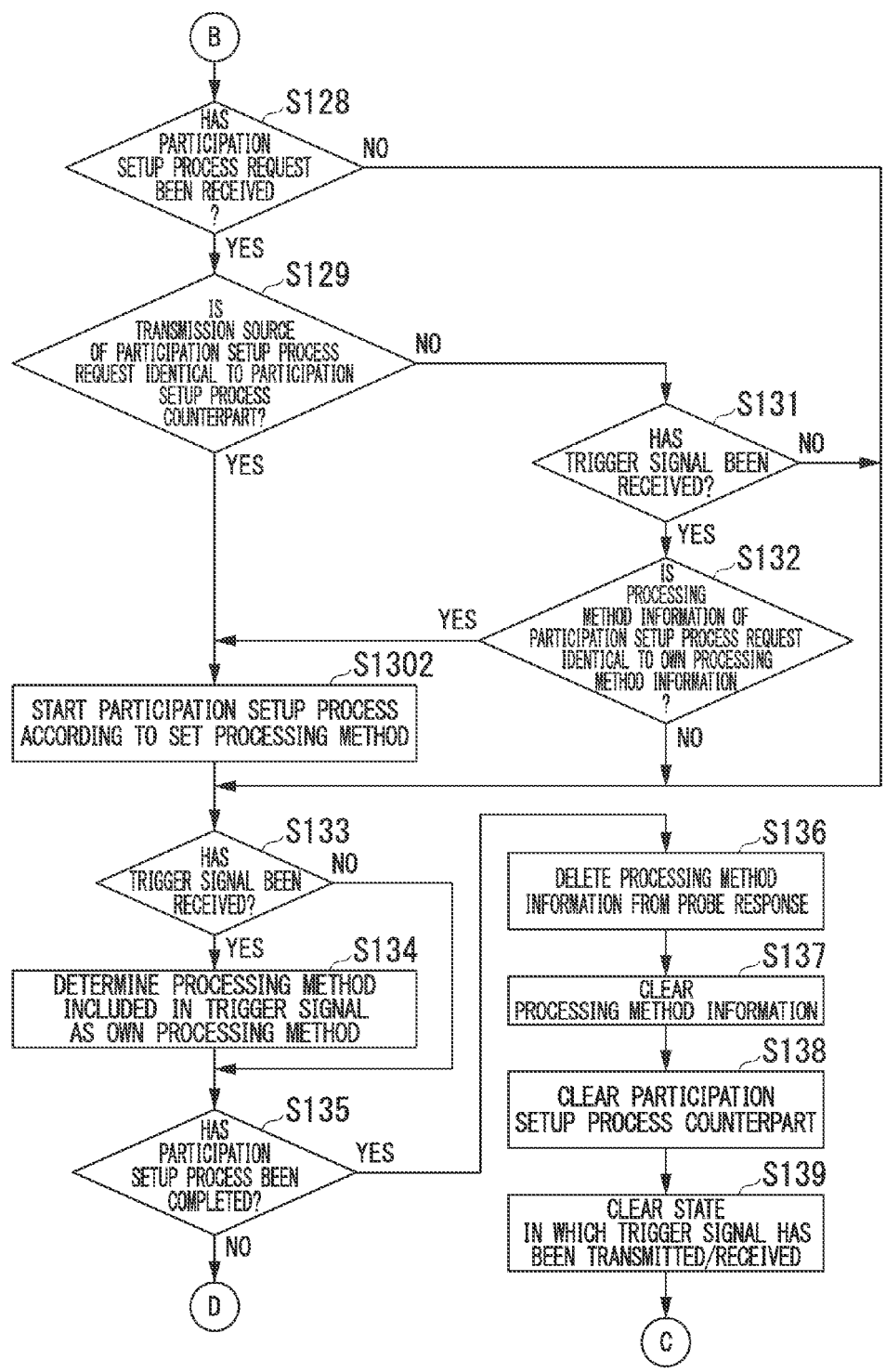
FIG. 19 is a flowchart illustrating an operation process of a wireless communication terminal in accordance with a preferred embodiment of the present invention.
Figure 20A:
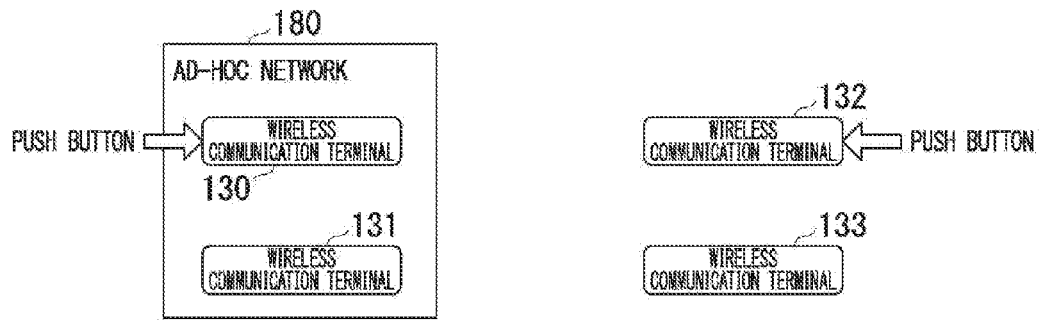
FIGS. 20A to 20C are reference diagrams illustrating a process of causing a non-participating wireless communication terminal to participate in an ad-hoc network.
Figure 20B:
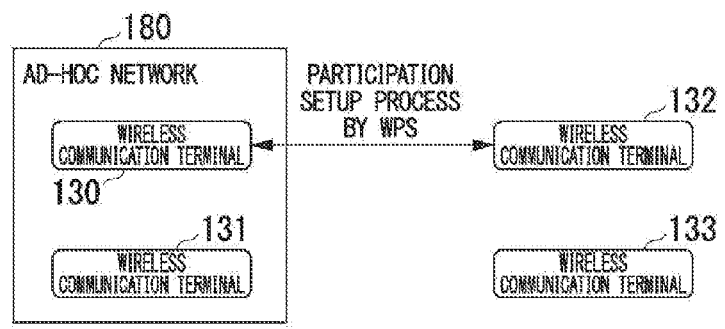
Figure 20C:
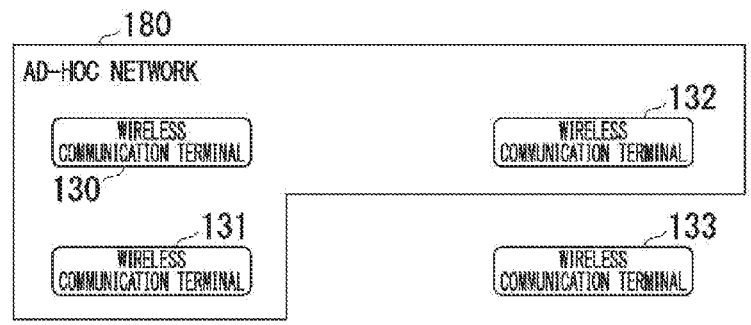
Figure 21A:
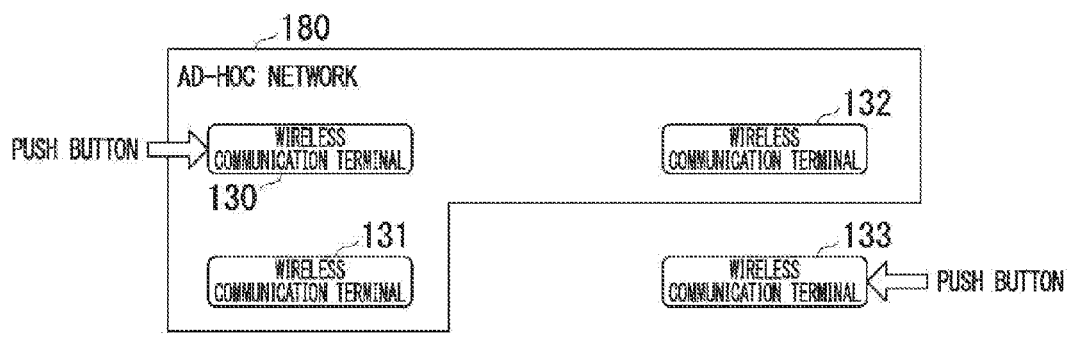
FIGS. 21A to 21C are reference diagrams illustrating a process of causing a non-participating wireless communication terminal to participate in an ad-hoc network.
Figure 21B:
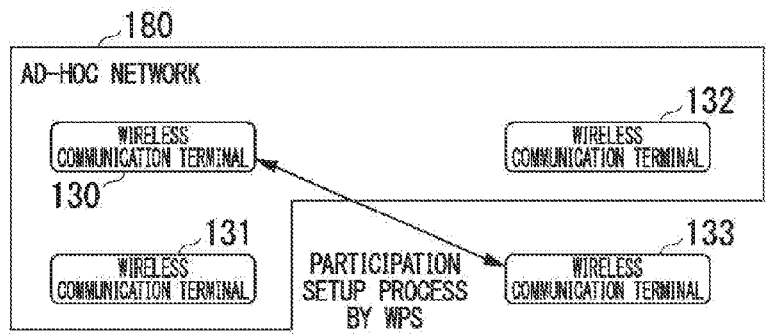
Figure 21C:
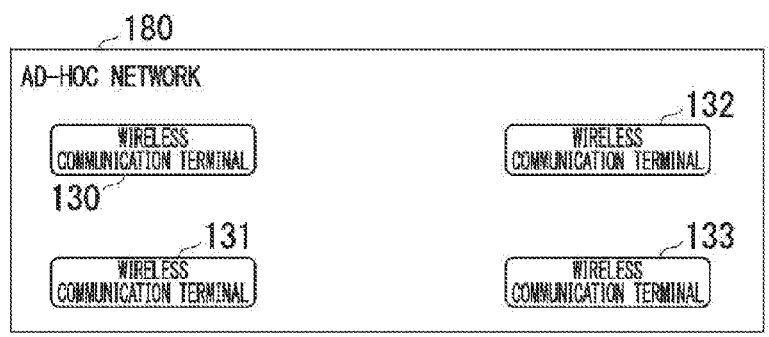
Figure 22A:
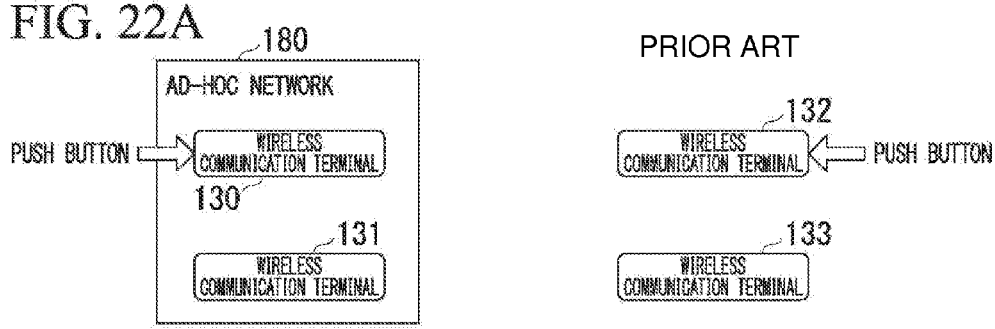
FIGS. 22A to 22D are reference diagrams illustrating a process of causing a non-participating wireless communication terminal to participate in an ad-hoc network.
Figure 22B:
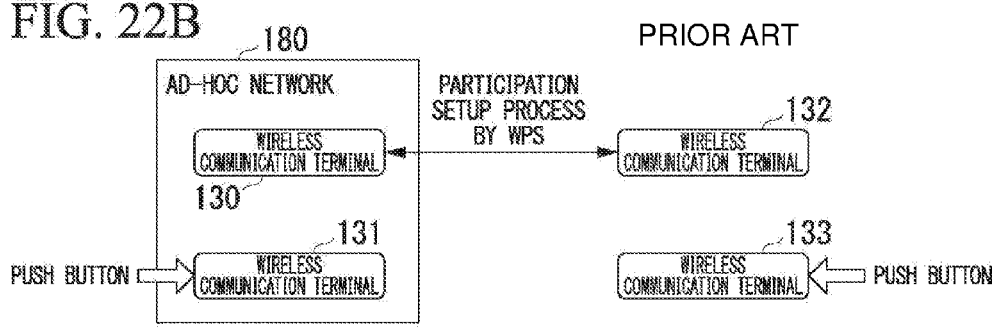
Figure 22C:
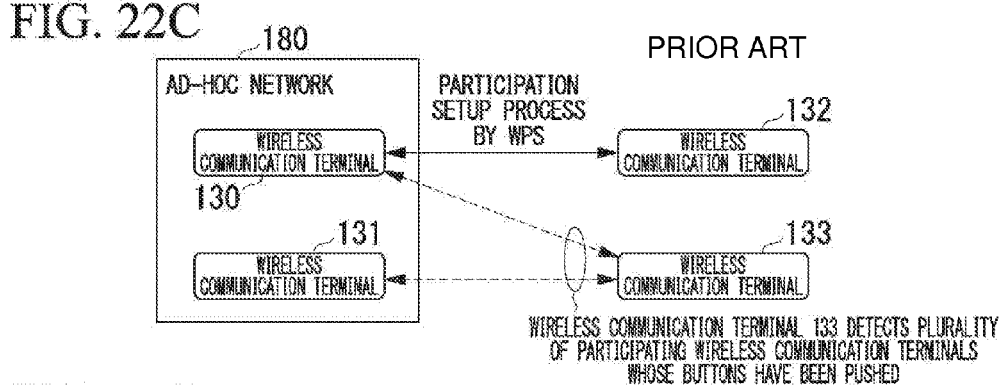
Figure 22D:
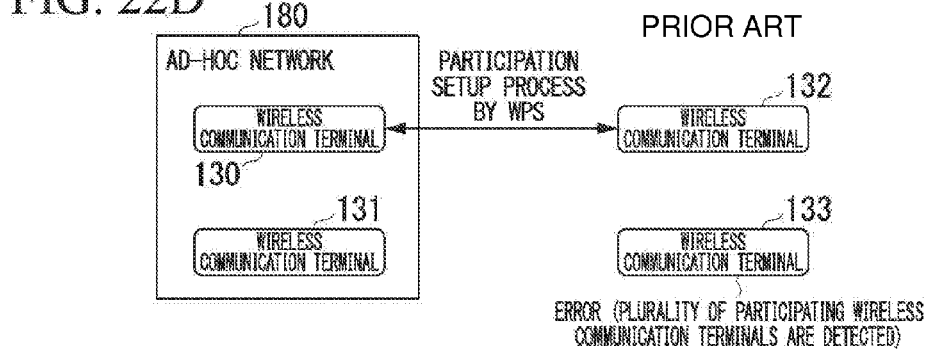

Next, a sixth operation example will be described with reference to FIGS. 17 to 19. FIGS. 17 to 19 illustrate a detailed processing procedure of a wireless communication terminal. FIG. 17 corresponds to FIG. 2 and mainly illustrates an operation of the wireless communication terminal that is not participating in the ad-hoc network. FIGS. 18 and 19 correspond to FIGS. 3 and 4, respectively, and mainly illustrate an operation of the wireless communication terminal that is participating in the ad-hoc network. In the following, the description will proceed in connection with parts different from the first operation example.

In the first to fifth operation examples, the processing method of the participation setup process is determined according to the event received by the wireless communication terminal. However, in the sixth operation example, the processing method of the participation setup process is set to a processing method which is determined in advance. In FIG. 17, when it is determined in step S101 that its own wireless communication terminal is not yet participating in the ad-hoc network, the control unit 10 sets a predetermined processing method as the processing method of the participation setup process (step S1011). The predetermined processing method refers to either the PBC method or the PIN method, and is a processing method which is determined in advance for each wireless communication terminal. Here, information of the set processing method is stored in the storage unit 13. Then, the process proceeds to step S102.

Further, when it is determined in step S102 that the predetermined event has been received, the control unit 10 controls the wireless communication unit 14 such that the probe request (participation request) including the processing method information representing the processing method set in step S100 is transmitted. Through this control of the control unit 10, the wireless communication unit 14 transmits the probe request (step S1030). Then, the process proceeds to step S1031.

Subsequently steps S1051 or S105, the control unit 10 controls the components in the wireless communication terminal such that the wireless communication terminal executes the participation setup process with the wireless communication terminal, which its own wireless communication terminal has determined as the participation setup process counterpart, according to the processing method set in step S1011 (step S1061). Then, the process proceeds to step S107.

In FIG. 18, when it is determined in step S121 that the predetermined event has been received, the control unit 10 sets a predetermined processing method as the processing method of the participation setup process (step S1222). The predetermined processing method refers to either the PBC method or the PIN method, and is a processing method which is determined in advance for each wireless communication terminal. Here, information of the set processing method is stored in the storage unit 13. Then, the control unit 10 changes the setting of the wireless communication terminal such that the processing method information representing the processing method set in step S1022 is included in (set to) the probe response to be transmitted subsequently (step S1223).

In FIG. 19, when it is determined in step S129 that the wireless communication terminal which is the transmission source of the participation setup process request is identical to the participation setup process counterpart determined by its own wireless communication terminal or when it is determined in step S132 that the processing method represented by the processing method information included in the participation setup process request is the same processing method as the processing method set in its own wireless communication terminal, the control unit 10 controls the components in the wireless communication terminal such that the wireless communication terminal executes the participation setup process with the wireless communication terminal, which its own wireless communication terminal has determined as the participation setup process counterpart, according to the processing method set in its own wireless communication terminal (step S1302). Then, the process proceeds to step S133.

In the sixth operation example, the first operation example is modified such that the processing method of the participation setup process is set to a predetermined processing method, but the second to fifth operation examples can be modified in a similar manner.

As described above, according to the present preferred embodiment, upon receiving a new probe request from a wireless communication terminal that is not participating in an ad-hoc network until a participation setup process is completed after the participation setup process starts, a wireless communication terminal that is participating in the ad-hoc network transmits a trigger signal. A wireless communication terminal that has received the trigger signal executes the participation setup process with the wireless communication terminal that is not participating in the ad-hoc network. Thus, a situation in which the wireless communication terminal that is not participating in the ad-hoc network is on standby for completion of the participation setup process which is being executed between itself and another wireless communication terminal does not occur. Thus, when a plurality of non-participating wireless communication terminals join the existing wireless network, the standby time of the participation setup process can be reduced, and time taken until participation of all of the non-participating wireless communication terminals is completed can be reduced.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A wireless communication terminal that is participating in a predetermined wireless network,
the wireless communication terminal comprising:
a storage unit that stores an identifier of a proxy wireless communication terminal in the wireless network;
a wireless communication unit that performs wireless communication with another wireless communication terminal;
an event receiving unit that receives a predetermined event;
a processing unit that starts a participation setup process of causing a non-participating wireless communication terminal that has wirelessly transmitted a participation setup process request for the wireless network to participate in the wireless network when a participation request for the wireless network and the participation setup process request for the wireless network are received after the predetermined event is received by the event receiving unit; and
a control unit that causes the wireless communication unit to wirelessly transmit the event request of requesting the proxy wireless communication terminal corresponding to the identifier stored in the storage unit to receive the event when a new participation request is received during a time from the beginning of the participation setup process by the processing unit until the participation setup process is completed.

2. The wireless communication terminal according to claim 1, wherein,
when the new participation request is received during the time from the beginning of the participation setup process by the processing unit until the participation setup process is completed, the control unit causes the wireless communication unit to wirelessly transmit information to notify of the proxy wireless communication terminal corresponding to the identifier stored in the storage unit to the non-participating wireless communication terminal that has wirelessly transmitted the new participation request.

3. The wireless communication terminal according to claim 1, wherein,
when the new participation request is received during the time from the beginning of the participation setup process by the processing unit until the participation setup process is completed, the control unit causes the wireless communication unit to wirelessly transmit information related to the non-participating wireless communication terminal that has wirelessly transmitted the new participation request to the proxy wireless communication terminal corresponding to the identifier stored in the storage unit.

4. The wireless communication terminal according to claim 1, wherein,
when the new participation request is received and a new event is received by the event receiving unit during the time from the beginning of the participation setup process by the processing unit until the participation setup process is completed, the control unit causes the wireless communication unit to wirelessly transmit the event request of requesting the proxy wireless communication terminal corresponding to the identifier stored in the storage unit to receive the event.

5. The wireless communication terminal according to claim 1, wherein
the control unit determines a method of the participation setup process based on the event received by the event receiving unit.

6. The wireless communication terminal according to claim 5, wherein
the method of the participation setup process is either a push button configuration (PBC) method or a personal identification number (PIN) method, which are specified in a Wi-Fi Protected Setup (WPS) connection initiation protocol.

7. The wireless communication terminal according to claim 1, further comprising an operating unit, wherein the event receiving unit receives the event by a predetermined operation of the operating unit or a predetermined operation of an application.

8. A wireless communication terminal that is participating in a predetermined wireless network, wherein
the wireless communication terminal participating in the wireless network that receives a predetermined event, then starts a participation setup process of causing a non-participating terminal that has wirelessly transmitted a participation setup process request to participate in the wireless network when a participation request for the wireless network and the participation setup process request for the wireless network are received from the non-participating terminal, and the wireless communication terminal wirelessly transmits an event request of requesting reception of the event when a new participation request is received during a time from the beginning of the participation setup process until the participation setup process is completed and is defined as a participating terminal,
the wireless communication terminal comprising:
a wireless communication unit that performs wireless communication with another wireless communication terminal;
an event receiving unit that receives the event when the event request is received from the participating terminal; and
a processing unit that starts the participation setup process of causing the non-participating terminal that has wirelessly transmitted the participation setup process request to participate in the wireless network when the participation setup process request is received from the non-participating terminal after the event is received by the event receiving unit.

9. The wireless communication terminal according to claim 8, wherein,
when information related to the non-participating terminal that has wirelessly transmitted the participation request received by the participating terminal is received from the participating terminal during the time from the beginning of the participation setup process by the participating terminal until the participation setup process is completed, the processing unit starts the participation setup process of causing the non-participating terminal that has wirelessly transmitted the participation setup process request to participate in the wireless network when the participation setup process request is received from the non-participating terminal represented by the information after the event is received by event receiving unit.

10. The wireless communication terminal according to claim 8, wherein
the processing unit starts the participation setup process of causing the non-participating terminal that has wirelessly transmitted the participation setup process request to participate in the wireless network when the participation request and the participation setup process request are received from the non-participating terminal after the event is received by event receiving unit.

* * * * *